Sept. 2, 1952                 G. J. PETERSON ET AL                 2,609,108
                              ARTICLE HANDLING MACHINE
Filed April 30, 1945                                        20 Sheets-Sheet 1
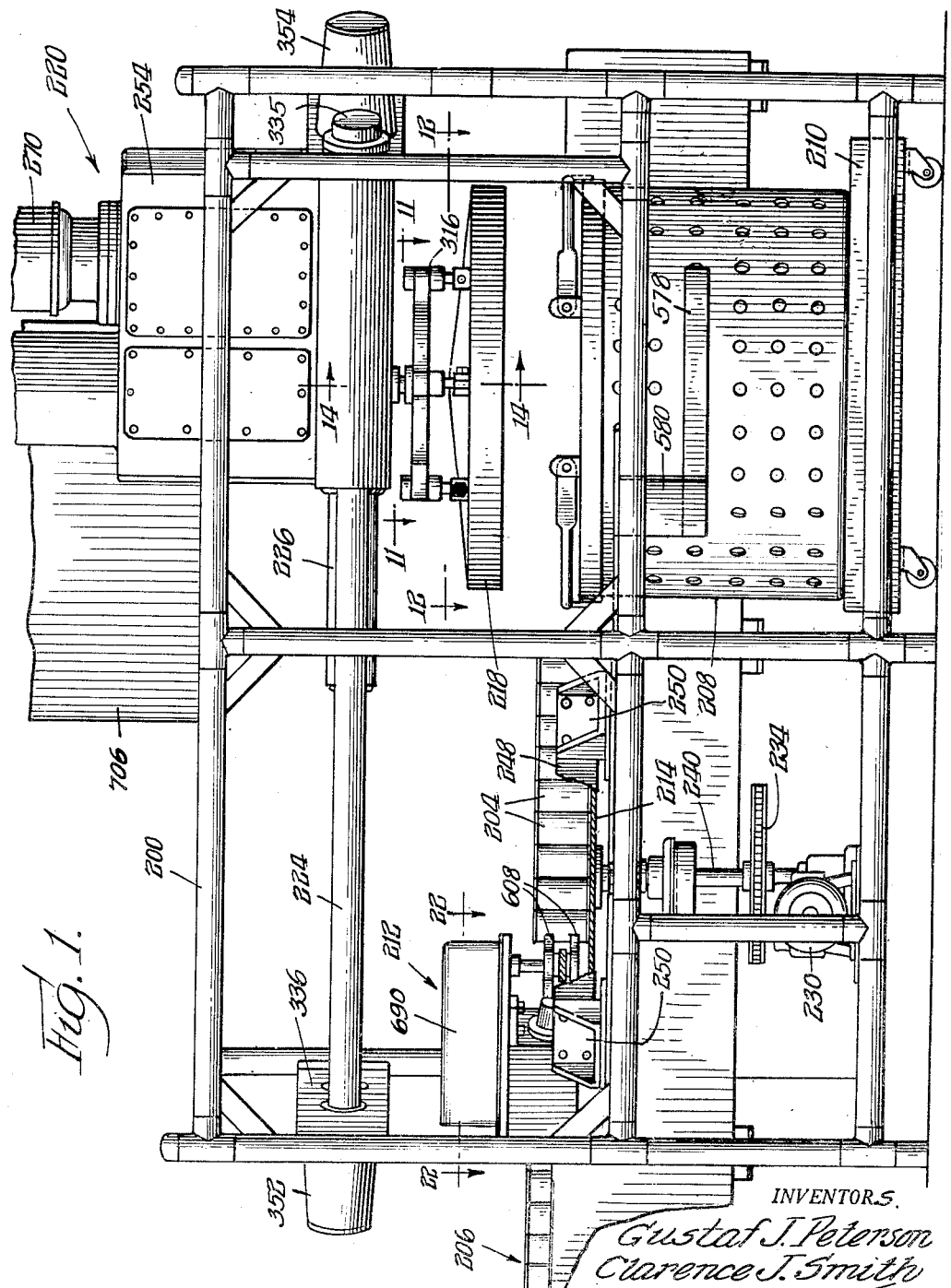
INVENTORS.
Gustaf J. Peterson
Clarence J. Smith
By: Moore, Olson & Trexler
                Attys.

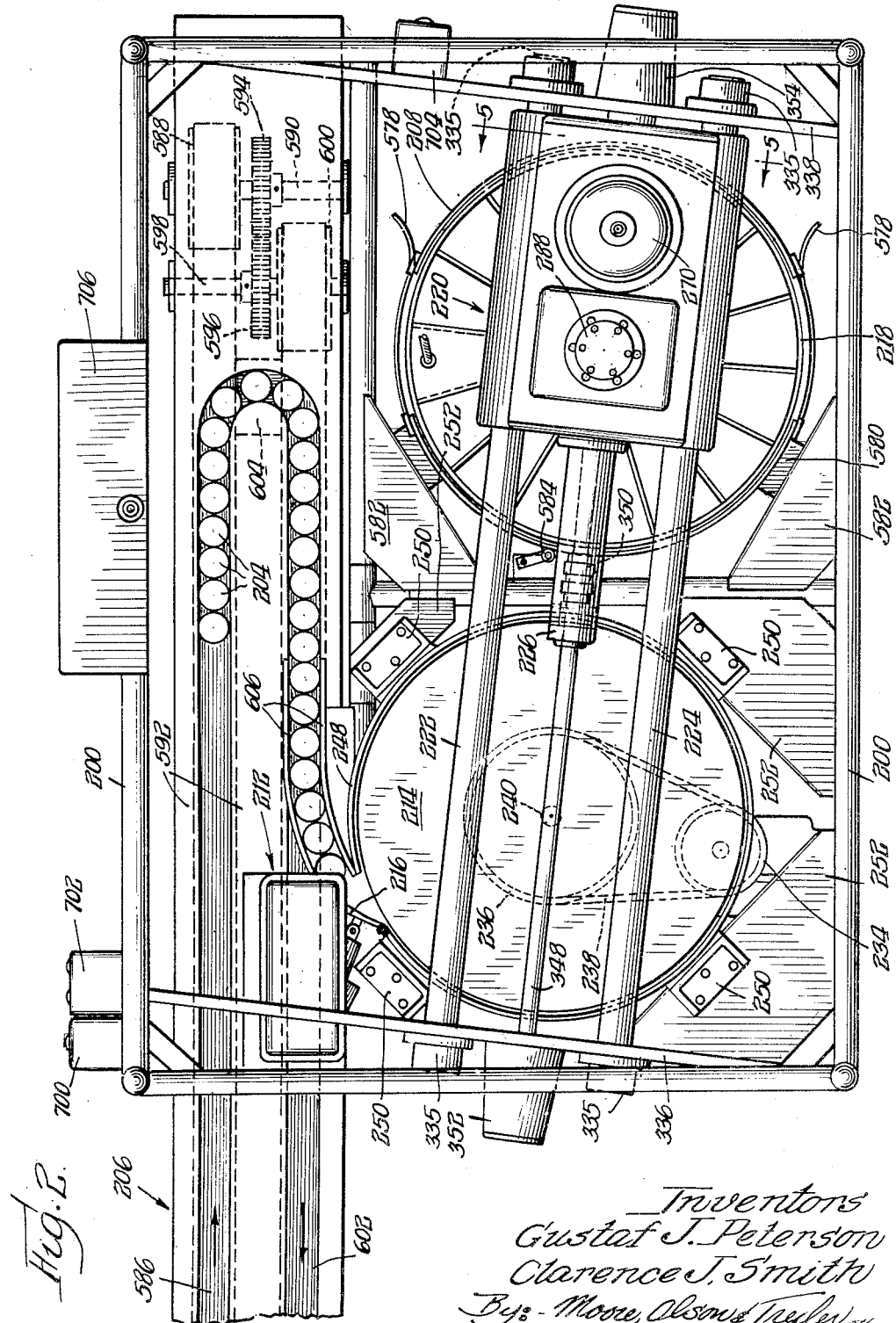

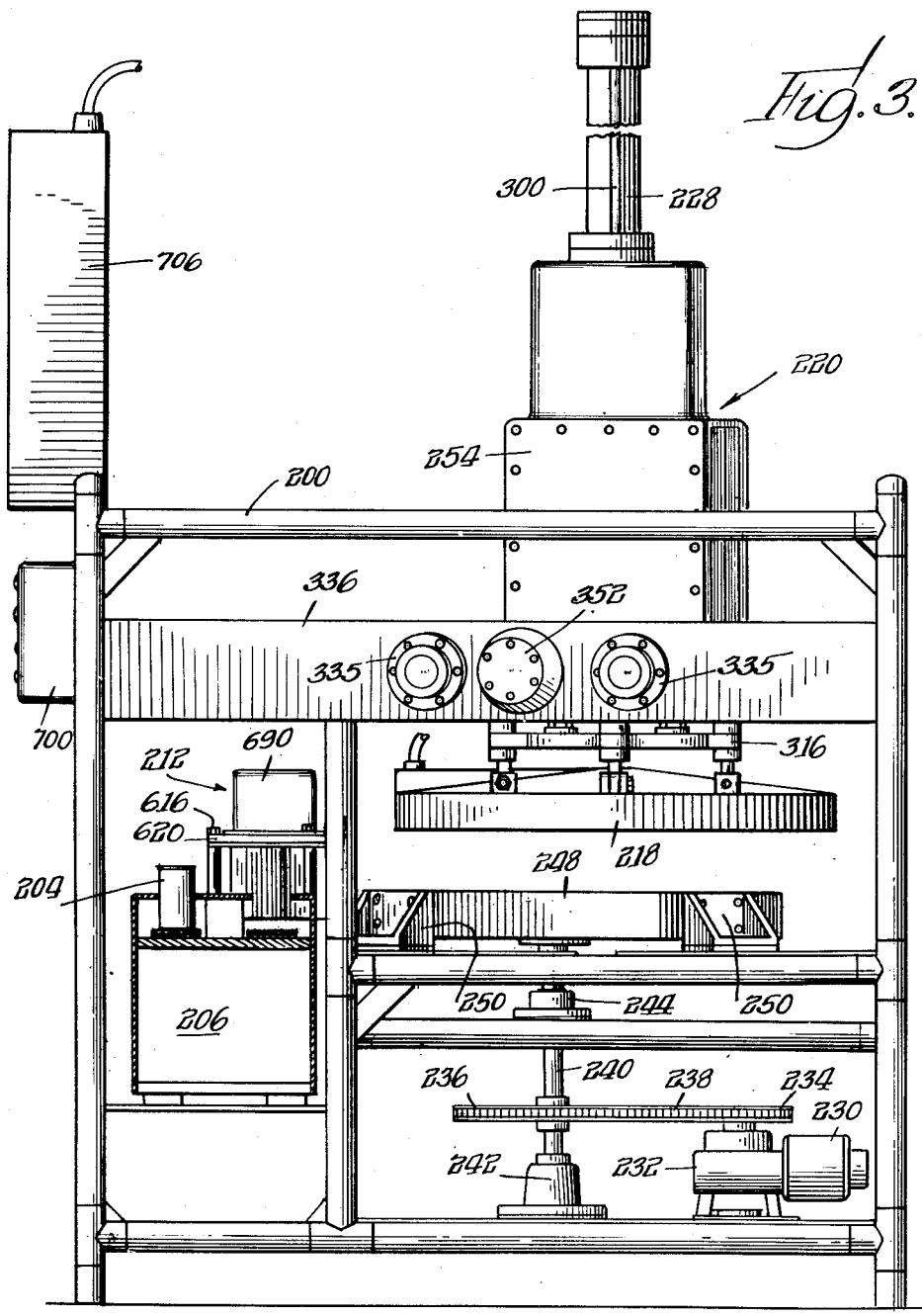

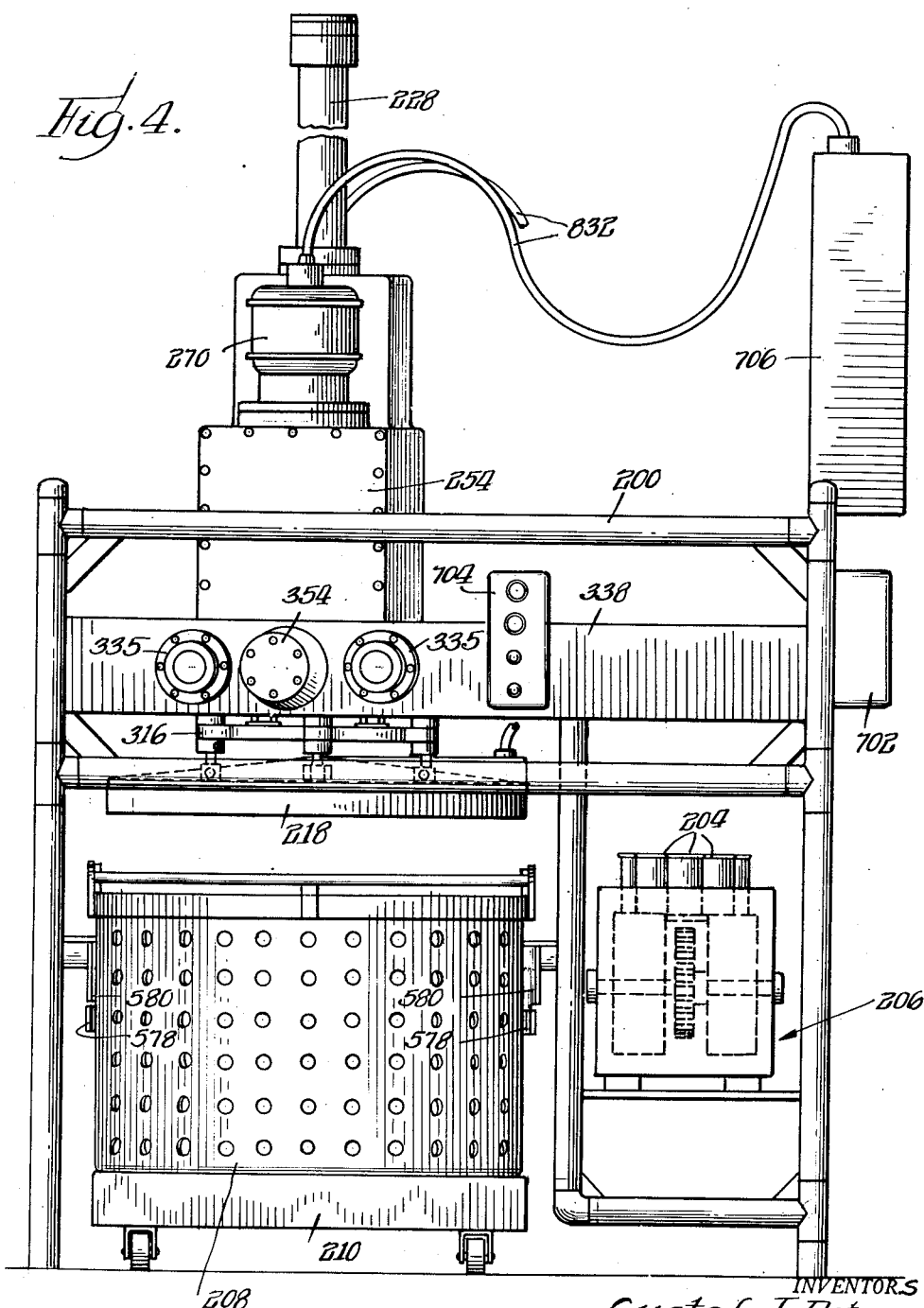

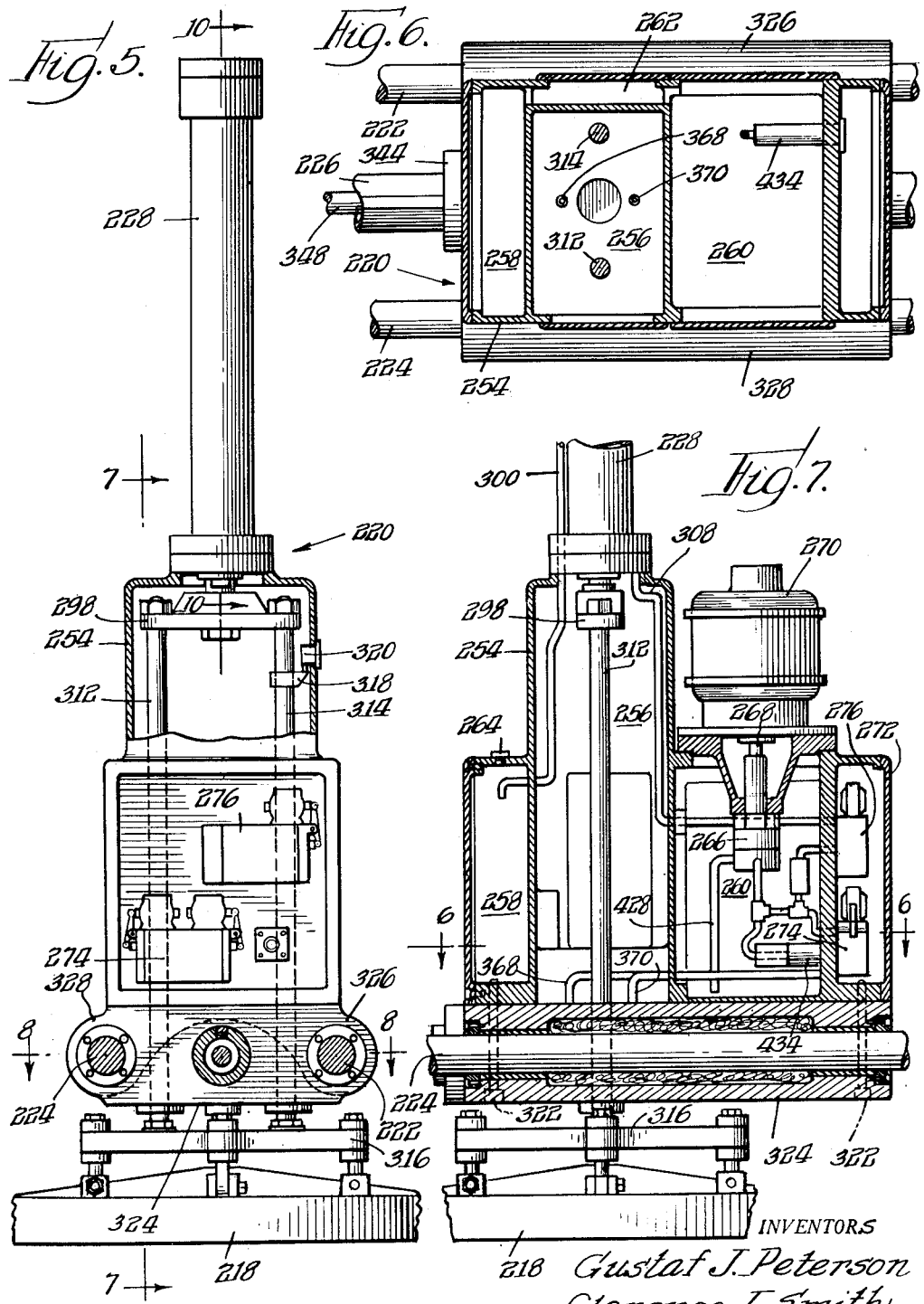

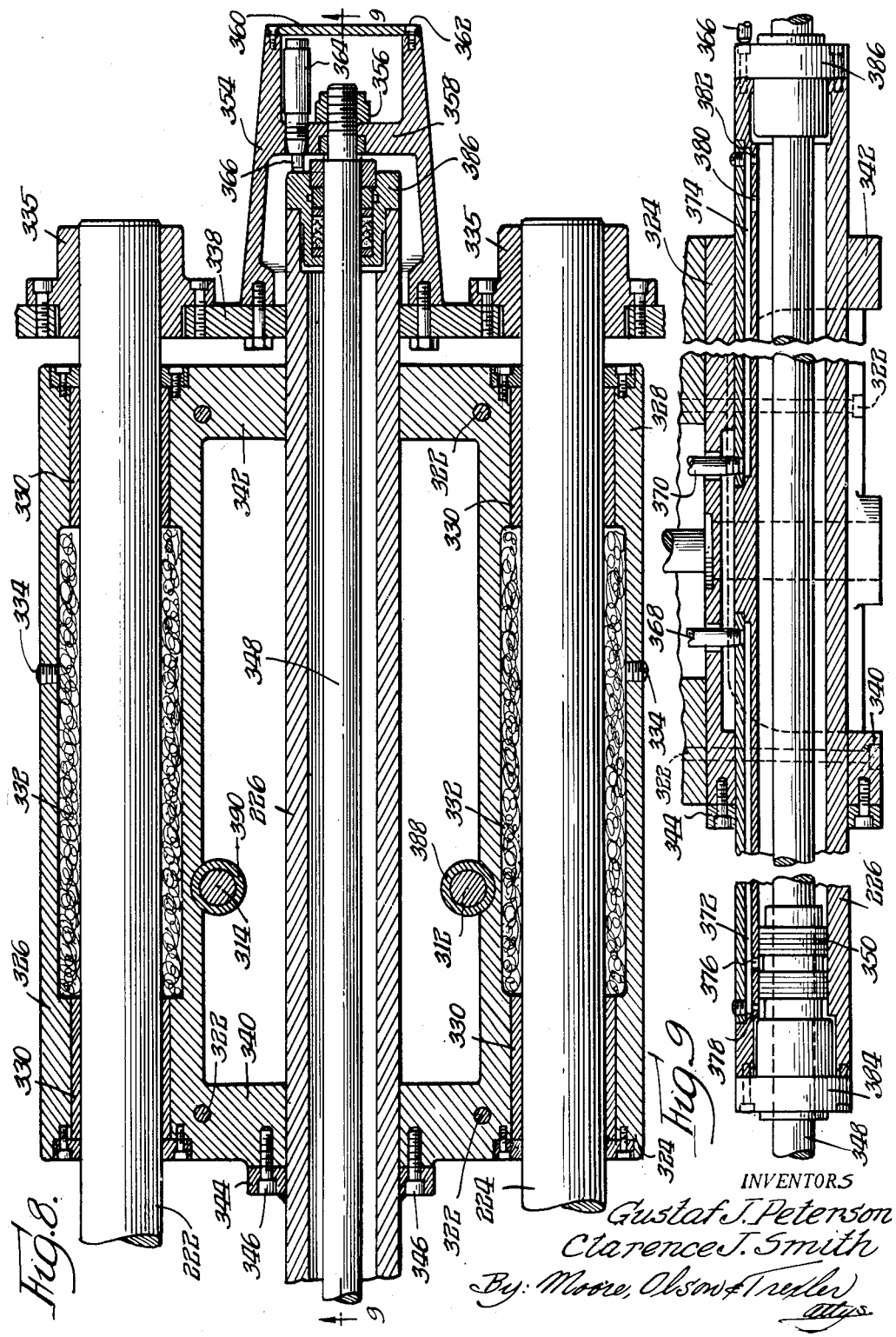

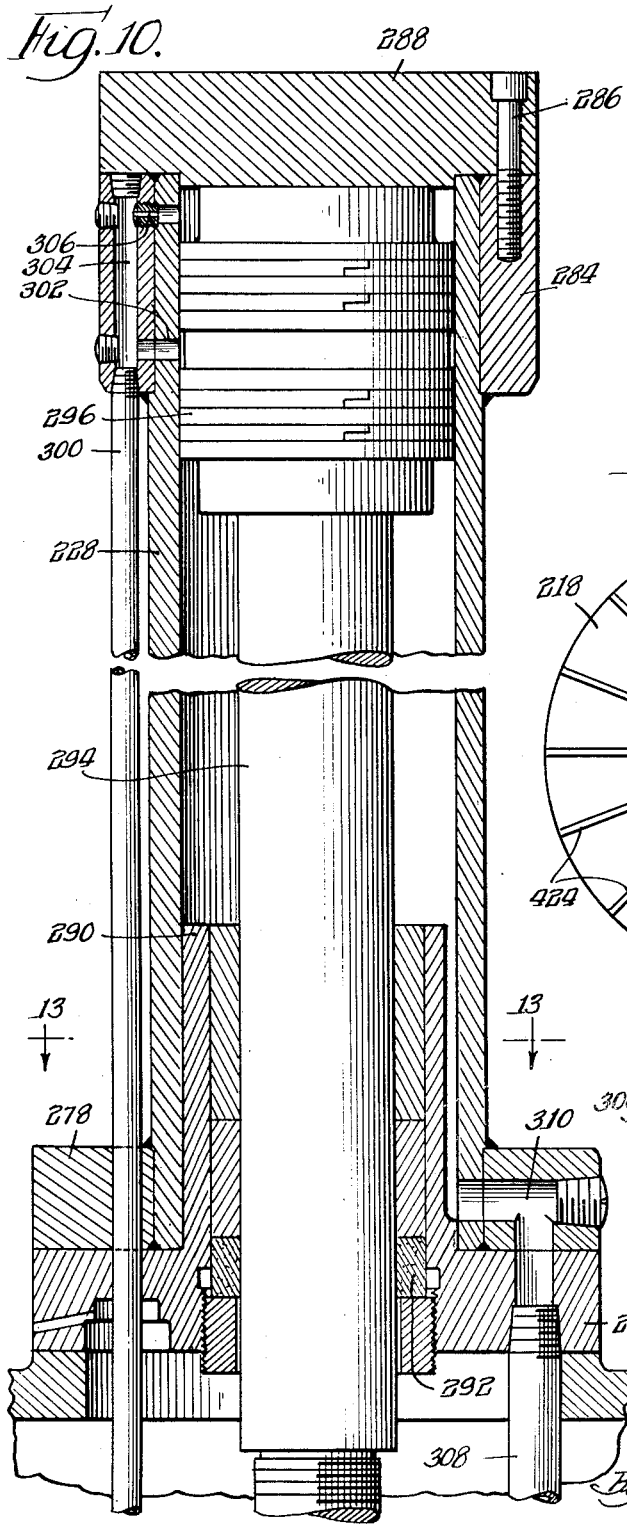
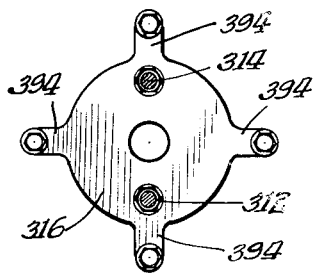
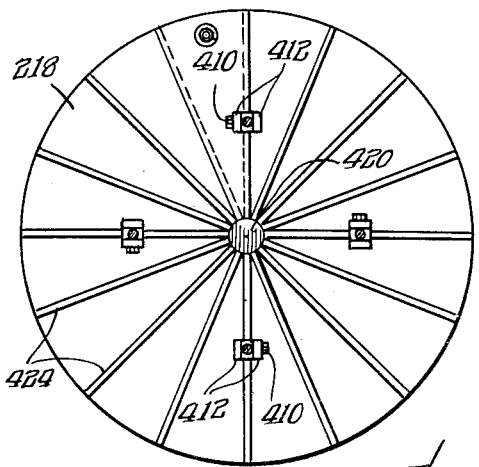
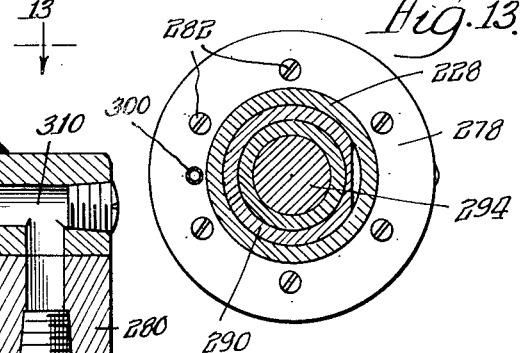
INVENTORS
Gustaf J. Peterson
Clarence J. Smith
By: Moore, Olson & Trexler
Attys

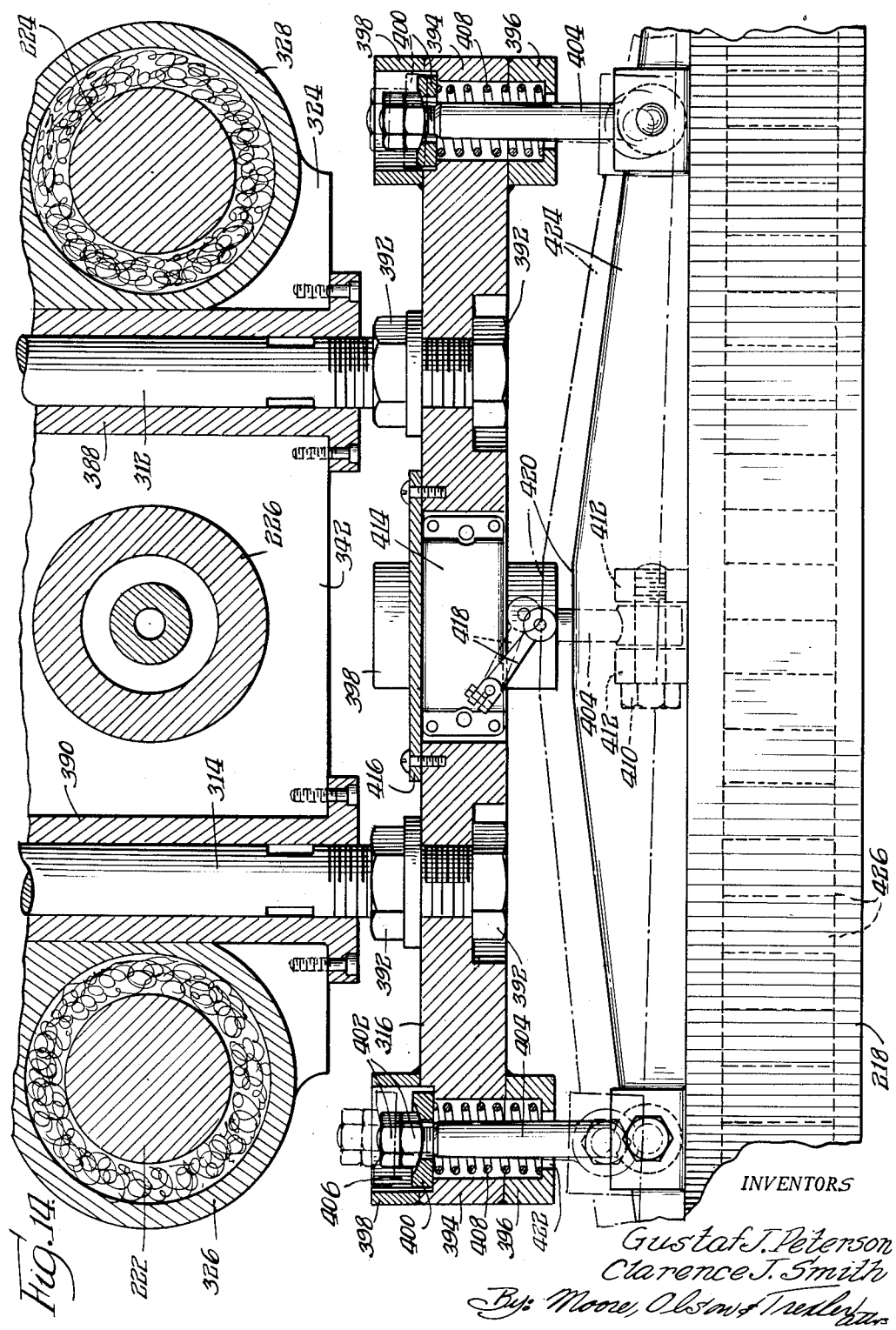

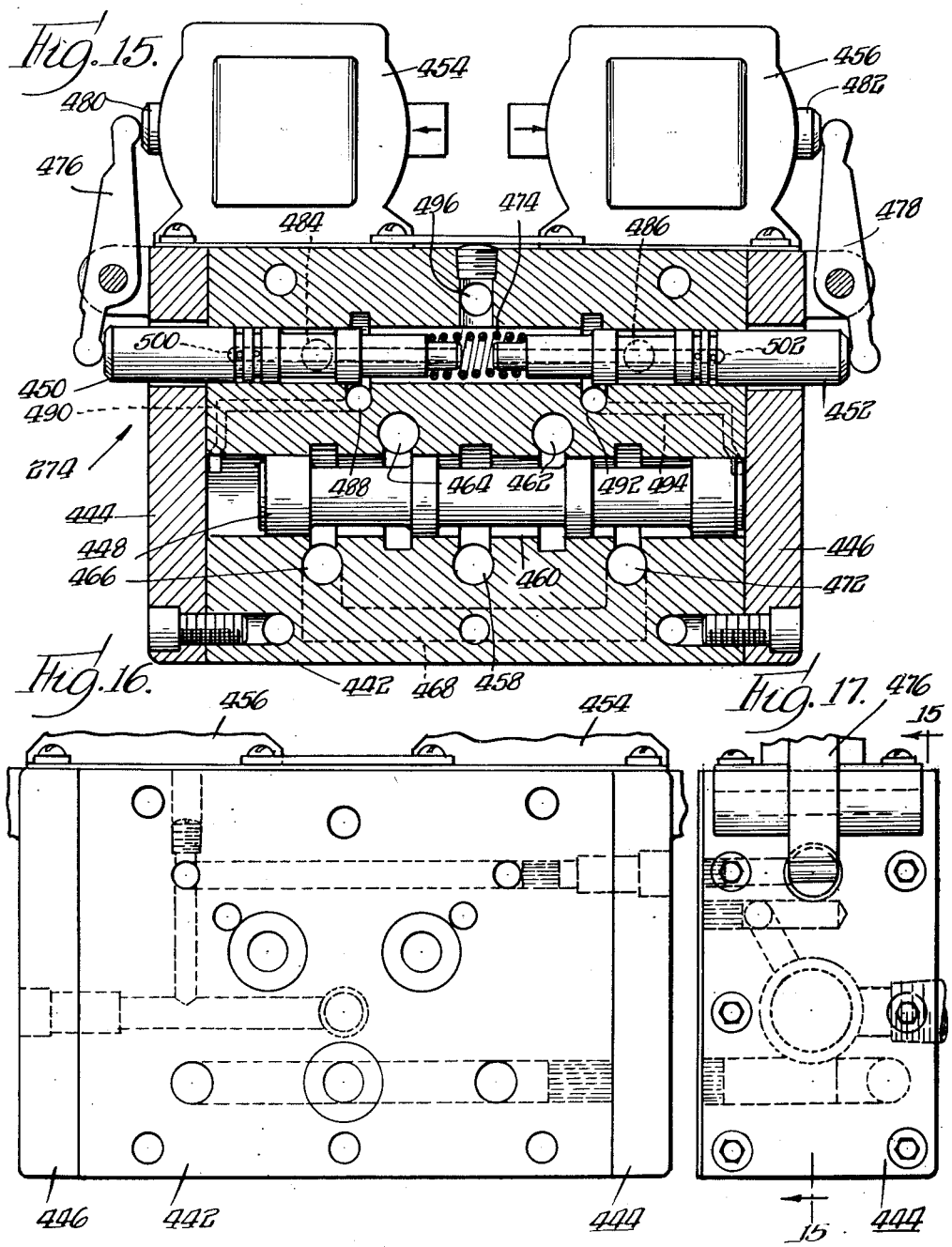

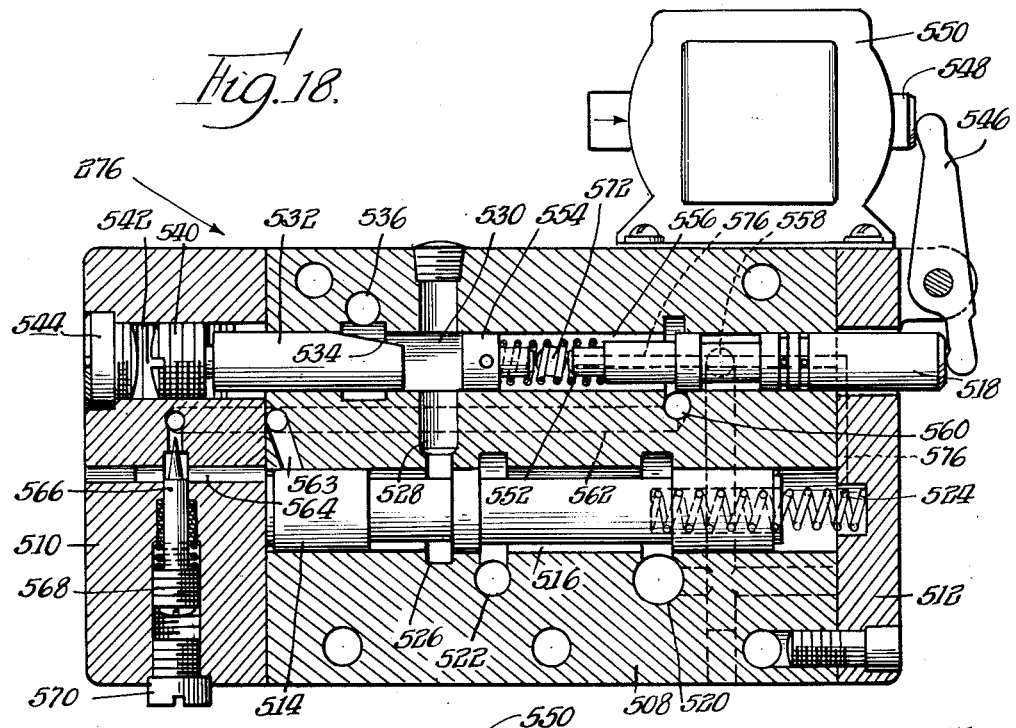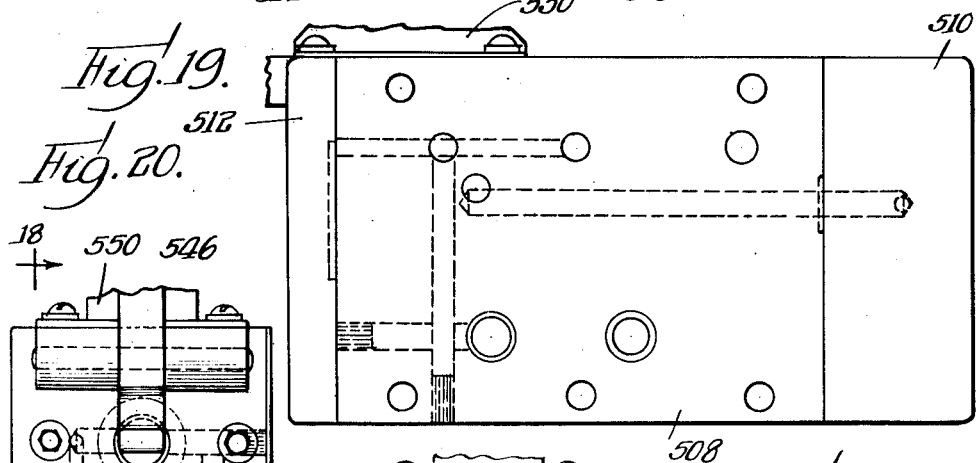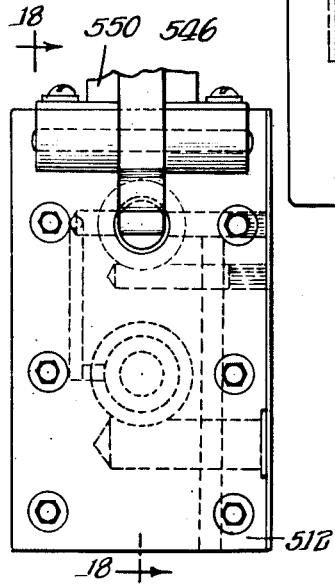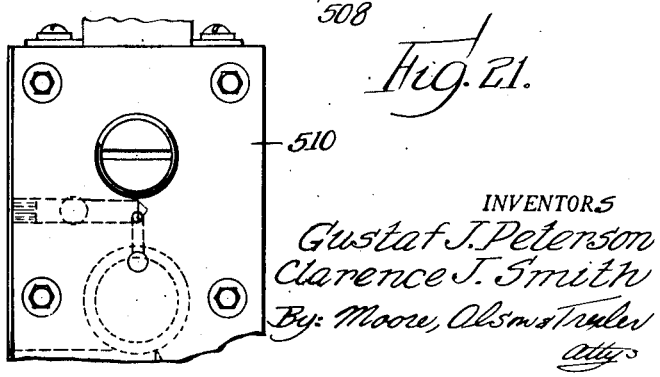

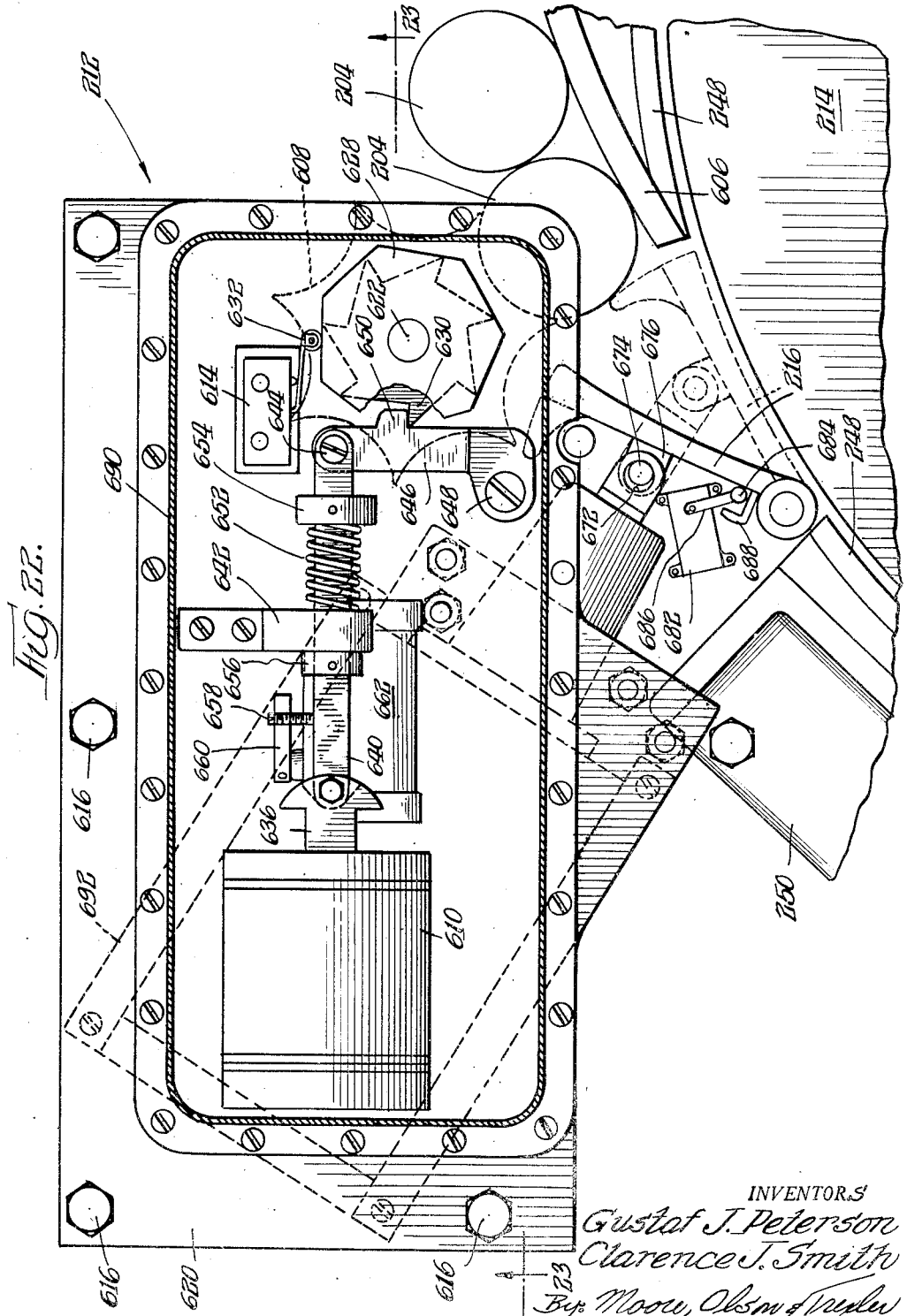

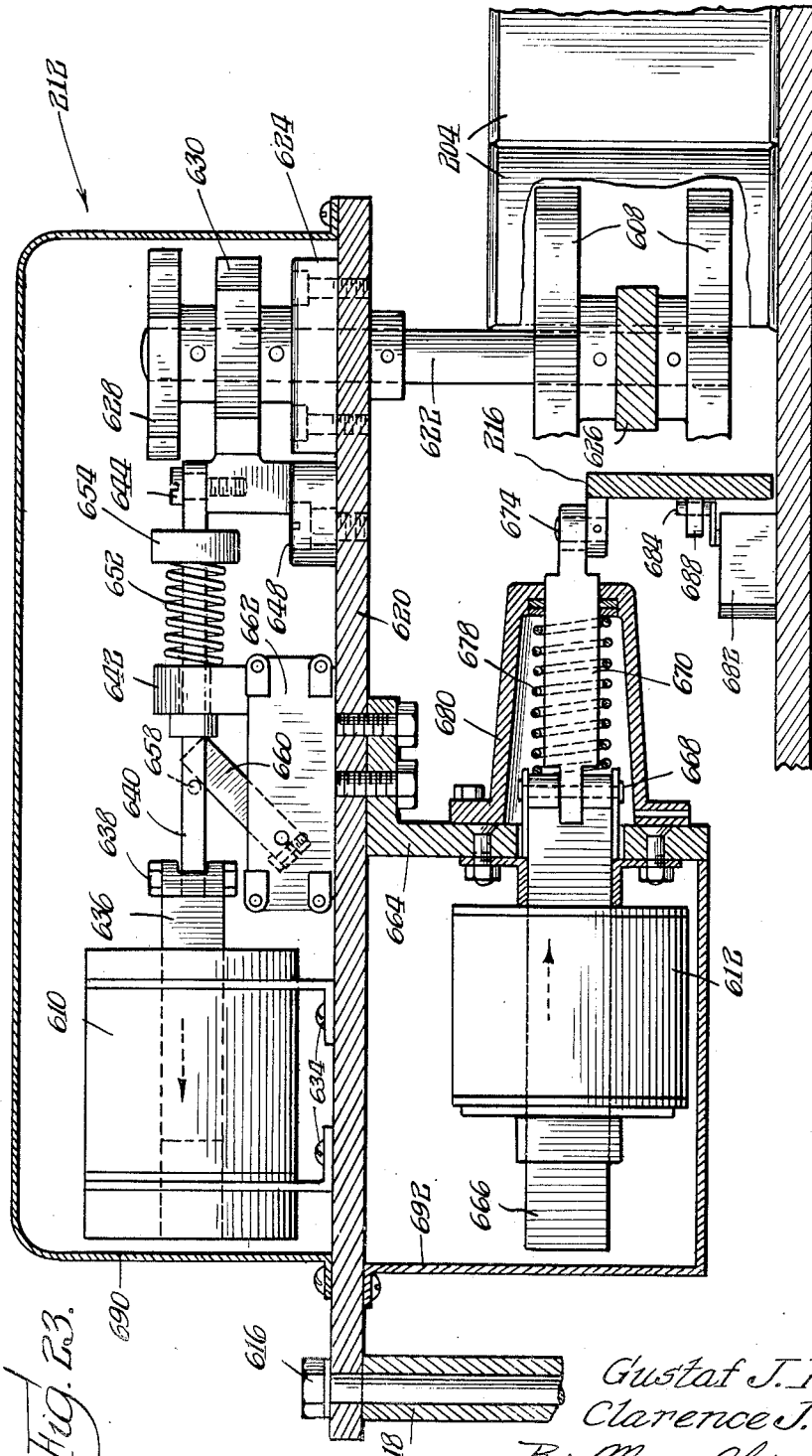

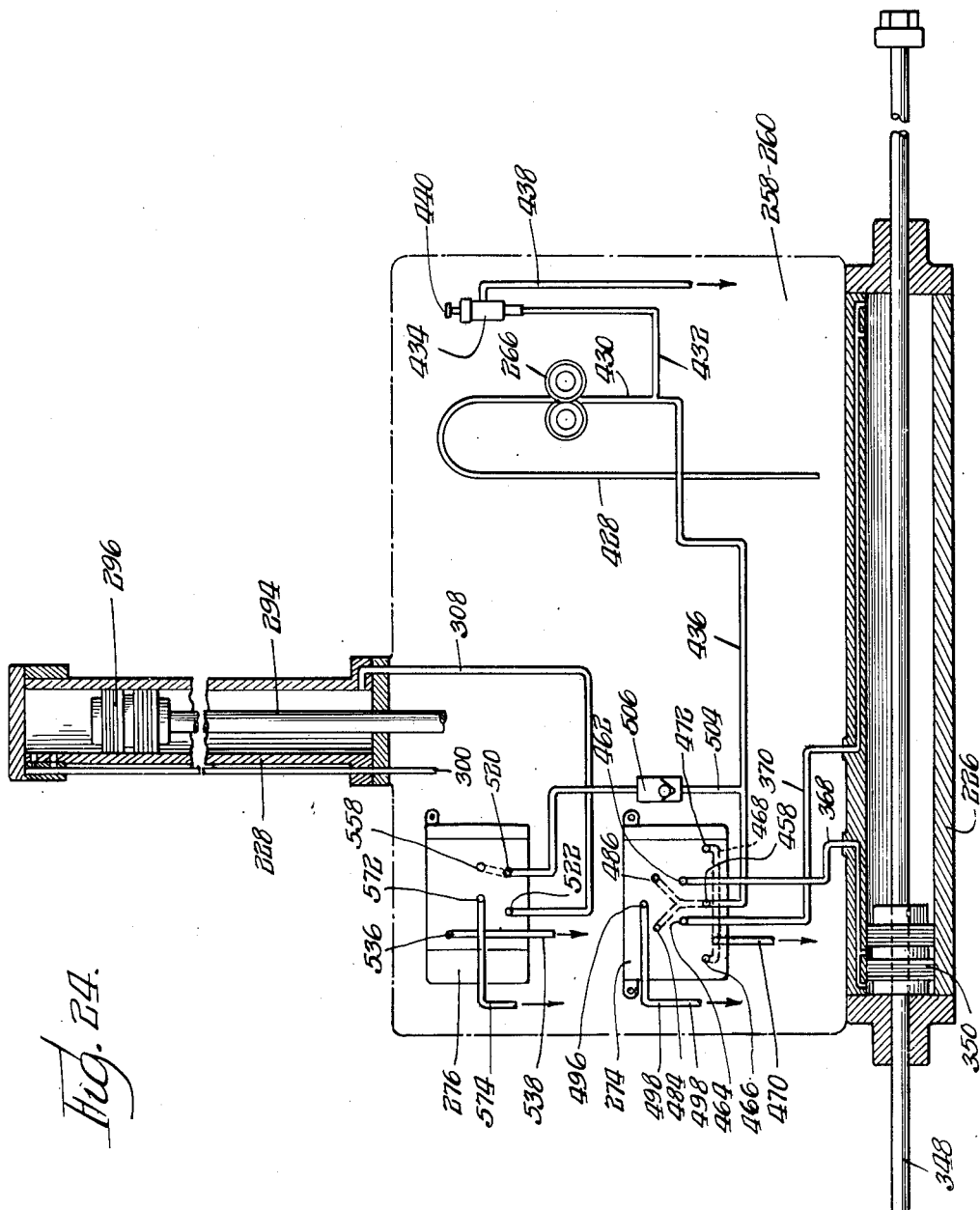

Sept. 2, 1952    G. J. PETERSON ET AL    2,609,108
ARTICLE HANDLING MACHINE
Filed April 30, 1945    20 Sheets-Sheet 14
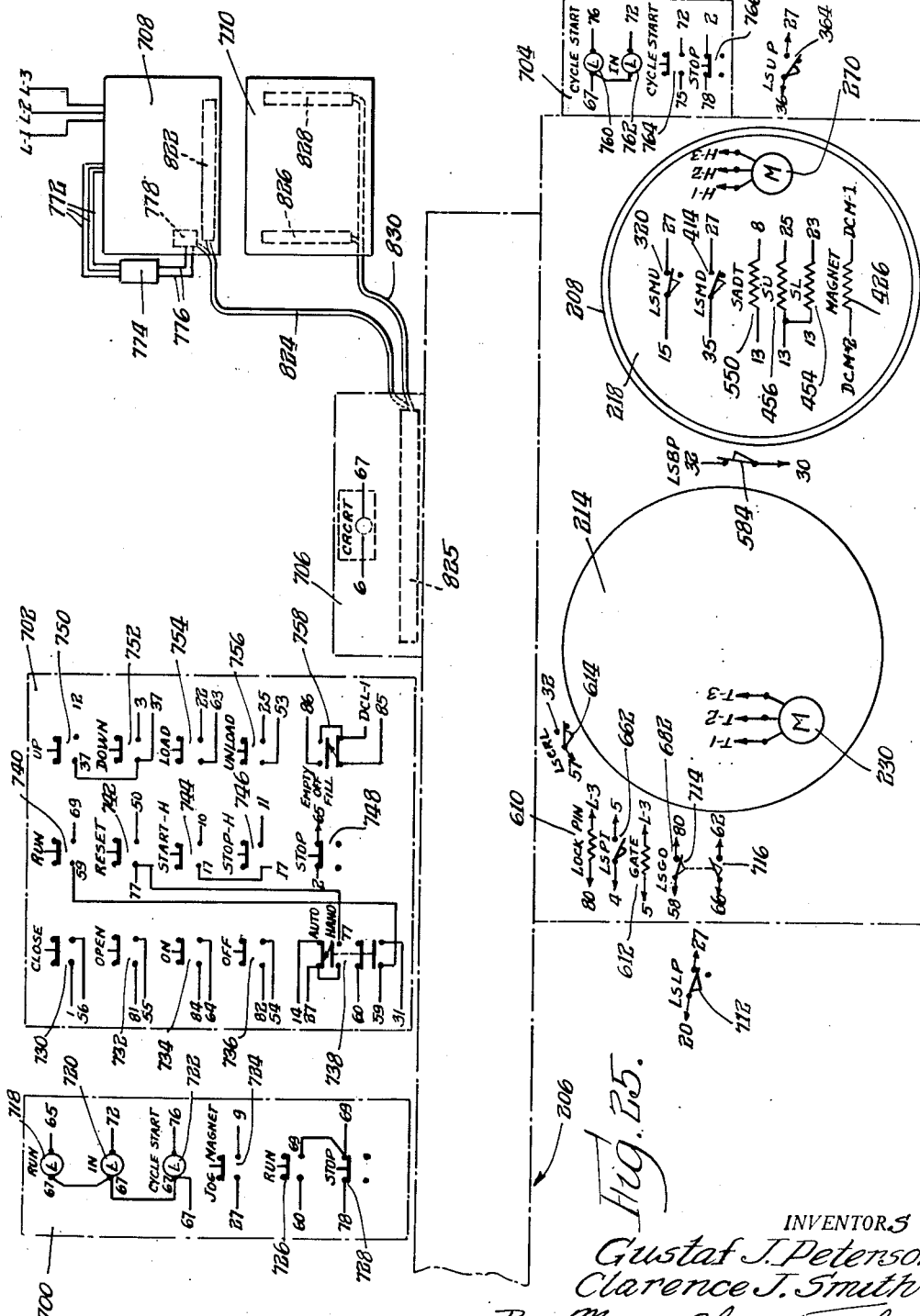
INVENTORS
Gustaf J. Peterson
Clarence J. Smith
By: Moore, Olson & Trexler
atty

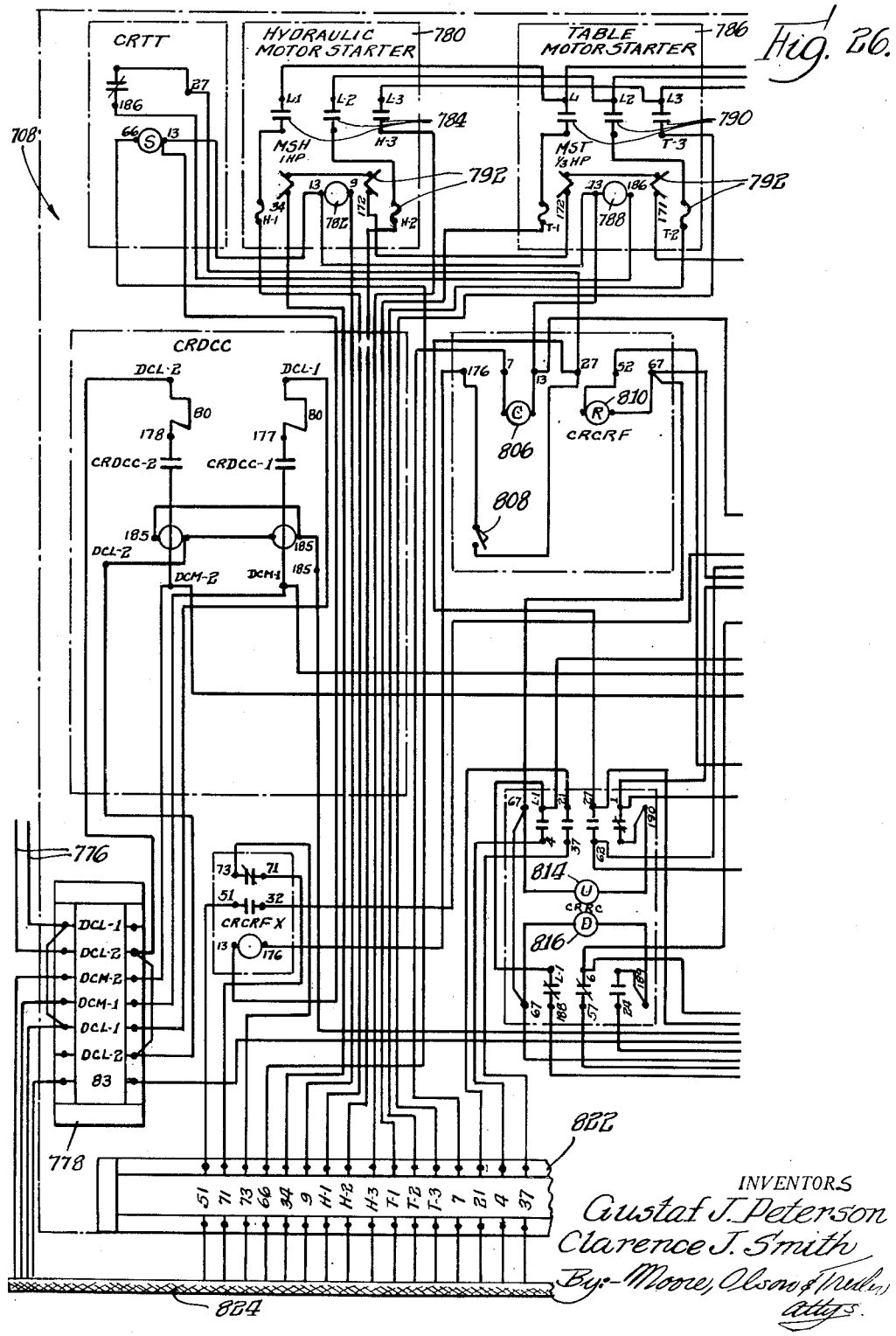

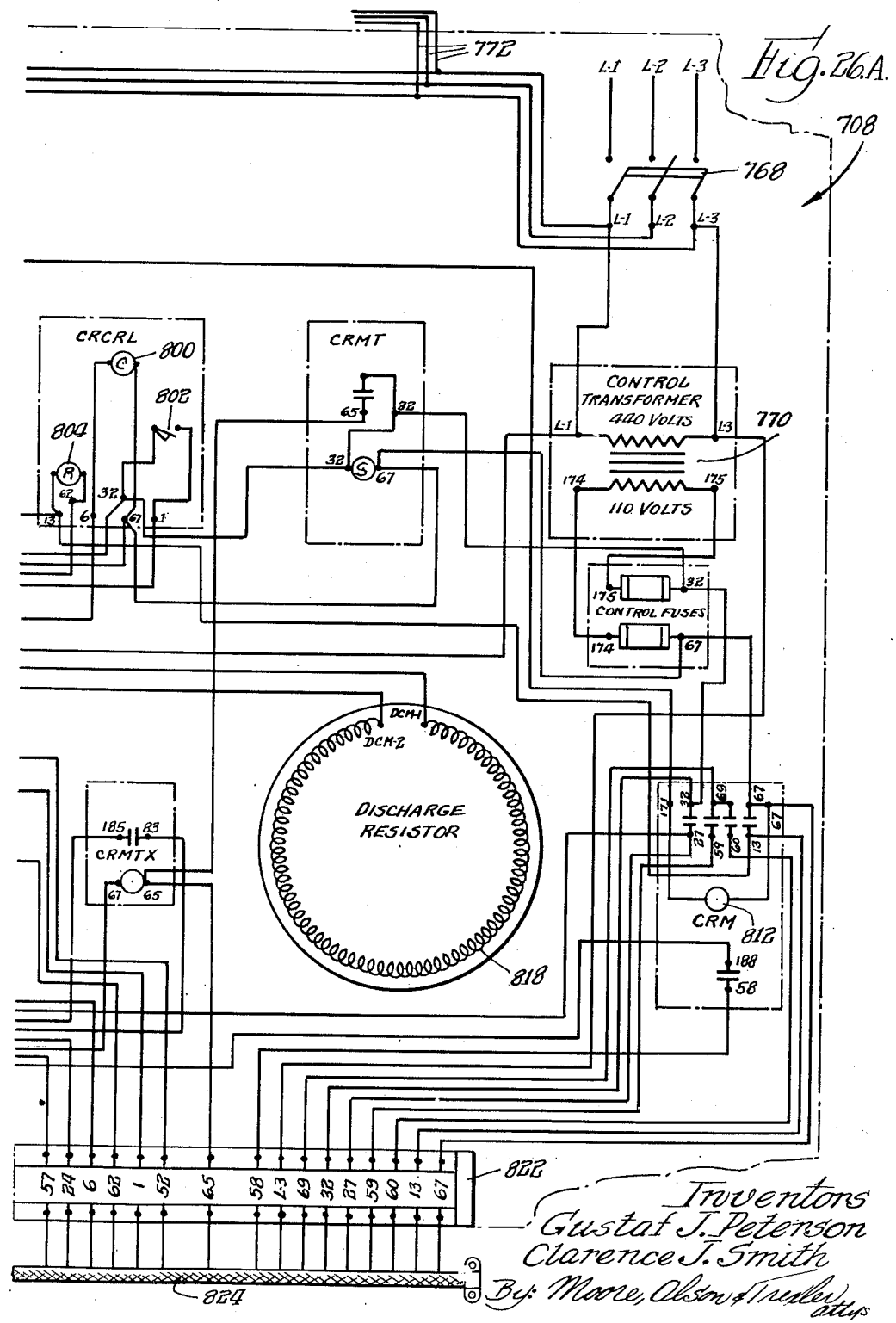

Fig. 27.

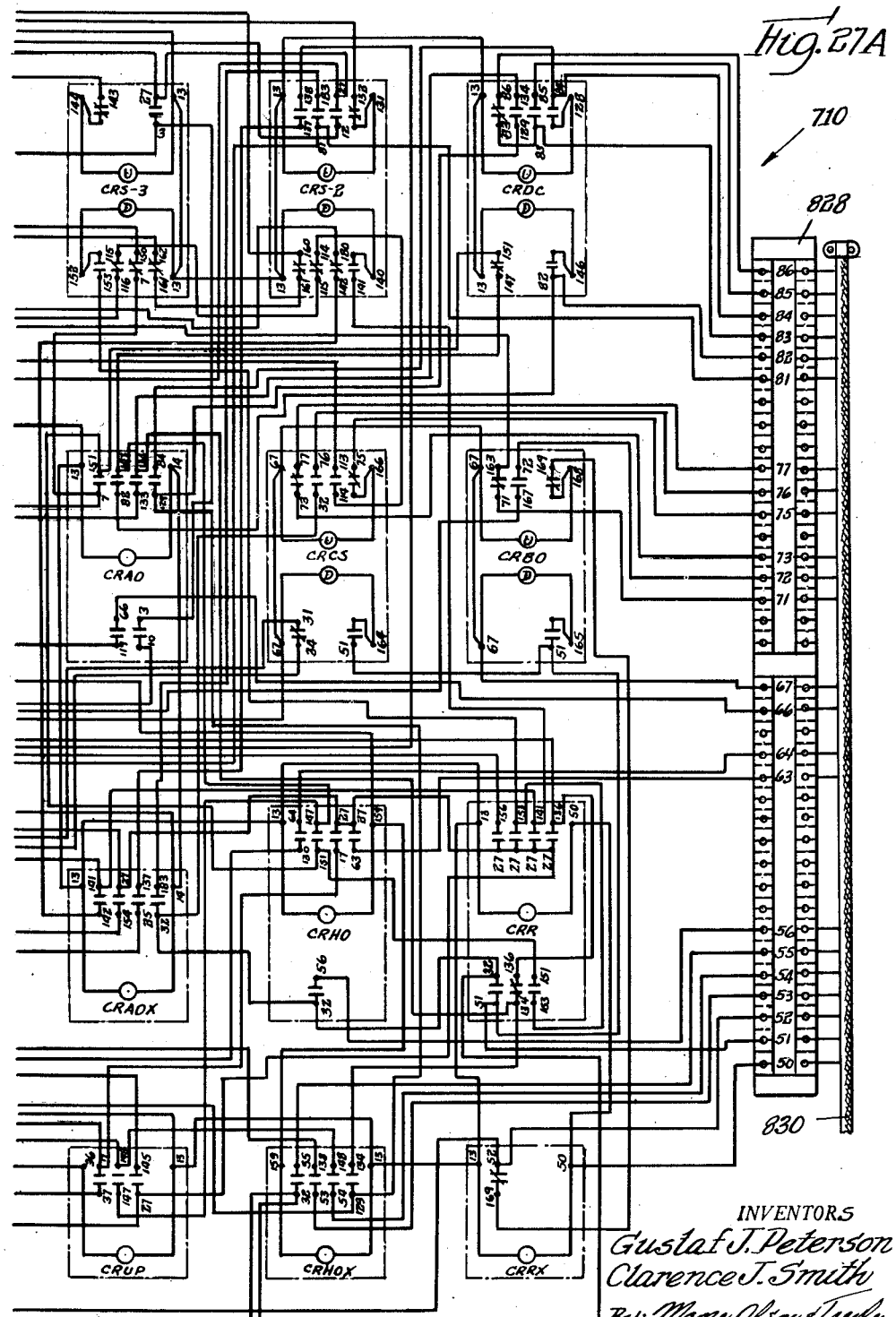

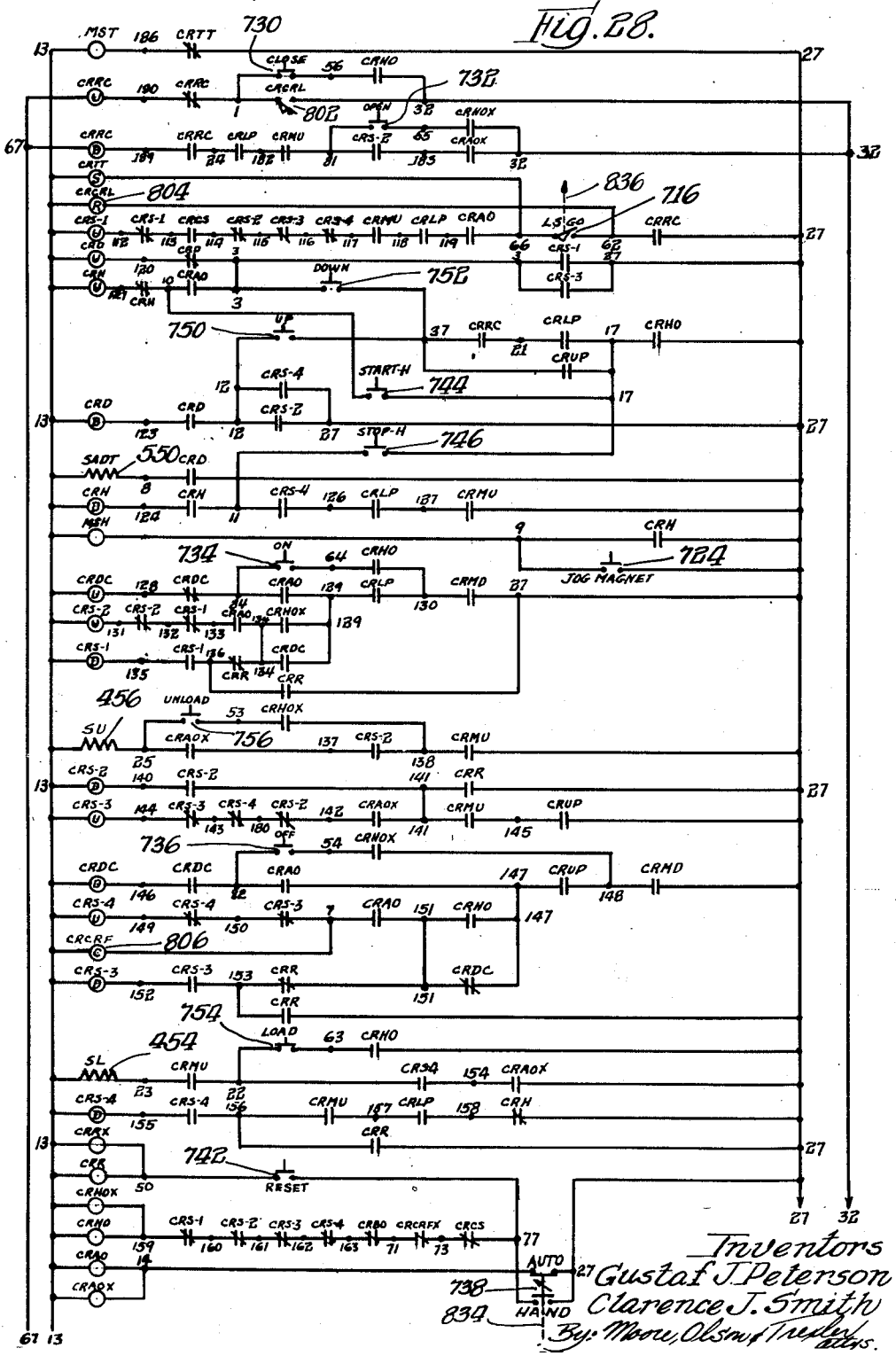

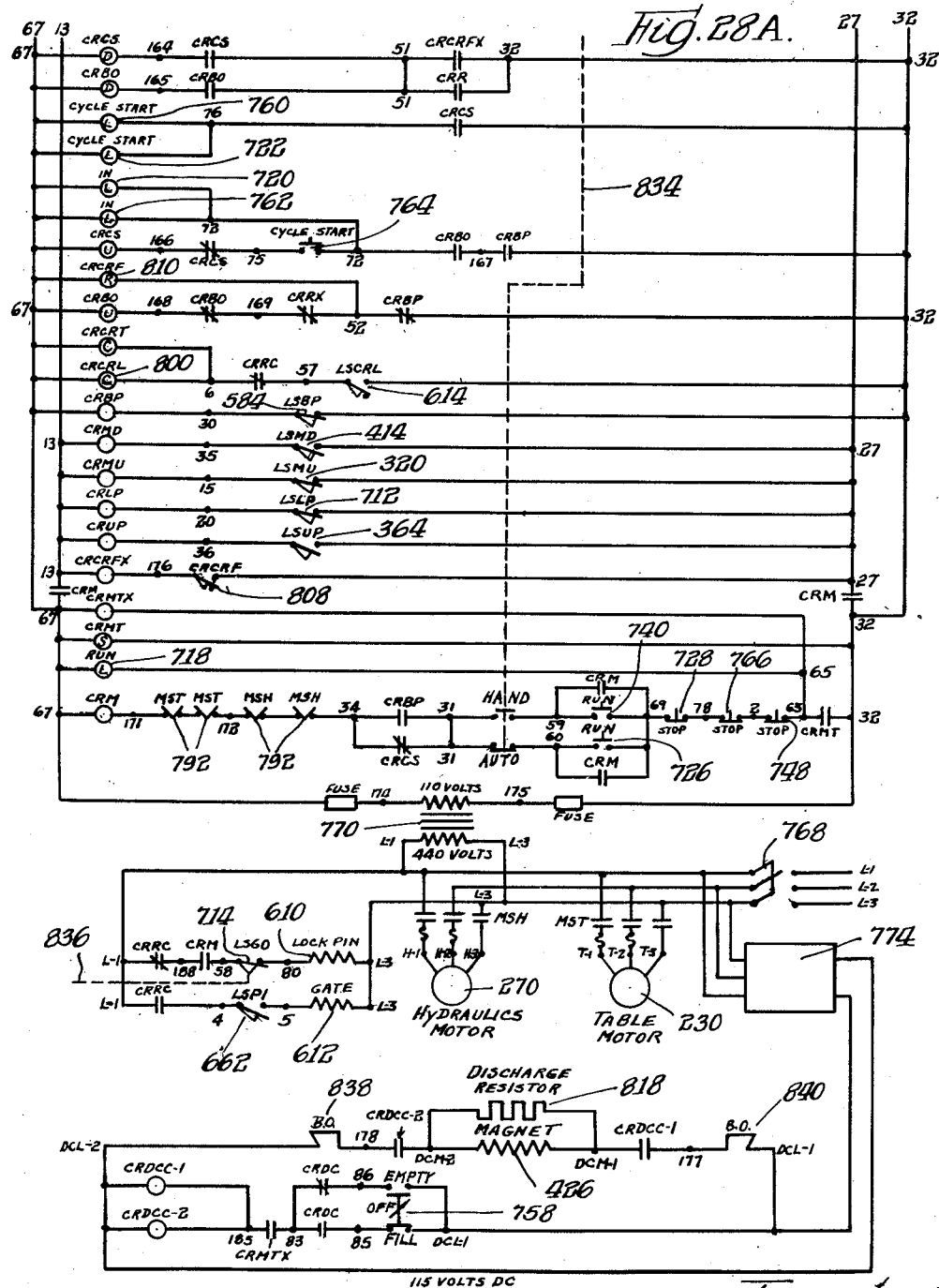

Patented Sept. 2, 1952

2,609,108

UNITED STATES PATENT OFFICE 2,609,108

ARTICLE HANDLING MACHINE

Gustaf J. Peterson and Clarence J. Smith, Rockford, Ill., assignors to Odin Corporation, Chicago, Ill., a corporation of Illinois Application April 30, 1945, Serial No. 591,026

38 Claims. (Cl. 214—1)

This invention relates to article handling machines and mechanisms, and concerns particularly machines for effecting the high speed and accurate handling of metal objects and articles, such for example as metal cans or the like, in connection with the manufacture or processing thereof.

It is an object of the invention to provide a machine of the type defined of improved construction and improved operating characteristics. More specifically stated, it is an object of the invention to provide an article handling machine having combined gripping and release means, and translating means, of improved construction and operation, and wherein the gripping, release, and translation of the articles may be more rapidly and reliably effected.

A further object of the invention is to provide an improved high speed article handling machine or mechanism, of the type defined, wherein the handling of frangible articles may be effected, without damage, and wherein articles of bulky or difficult to handle shape may be readily translated from one given desired station to another, in a rapid and expeditious manner.

A still further object of the invention is to provide an improved article handling machine of the type defined, for metallic articles or objects, employing combined magnetic gripping and release means, and translating means, for the articles.

Another object of the invention is to provide in an article handling machine of the type defined, improved hydraulic means and mechanisms for effecting the article translation and the shifting of the article or object translating member.

Still another object of the invention is to provide an improved can handling machine.

Various other objects, advantages and features of the invention will be apparent from the following specification when taken in connection with the accompanying drawings wherein a preferred embodiment is set forth for purposes of illustration.

In the drawings, wherein like reference numerals refer to like parts throughout:

Fig. 1 is a side elevation of a can handling machine constructed in accordance with the invention, and embodying the principles thereof, in accordance with the preferred embodiment disclosed;

Fig. 2 is a top view of the machine;

Fig. 3 is an end view, looking from the left as seen in Figs. 1 and 2;

Fig. 4 is an end view looking from the right as seen in Figs. 1 and 2;

Fig. 5 is an enlarged detail view, partly in section and with parts broken away, of the pump and valve head structure, and associated parts, taken as indicated by the line 5—5 of Fig. 2;

Fig. 6 is a horizontal sectional view of the head on the line 6—6 of Fig. 7;

Fig. 7 is a vertical sectional view of the head on the line 7—7 of Fig. 5;

Fig. 8 is a horizontal sectional view, on a further enlarged scale, and taken as indicated by the line 8—8 of Fig. 5, of the horizontal actuator and associated track structure for guiding the head in its horizontal movements;

Fig. 9 is a vertical sectional view of the horizontal actuator, on the line 9—9 of Fig. 8;

Fig. 10 is a longitudinal sectional view of the head vertical actuator, on a further enlarged scale and taken as indicated by the line 10—10 of Fig. 5;

Fig. 11 is a detail view of the magnet support plate, as seen along the line 11—11 of Fig. 1;

Fig. 12 is a detail view of the magnet, as seen along the line 12—12 of Fig. 1;

Fig. 13 is a horizontal section through the vertical actuator, on the line 13—13 of Fig. 10;

Fig. 14 is an enlarged vertical sectional detail of the magnet and its support plate and associated parts, taken as indicated by the line 14—14 of Fig. 1;

Fig. 15 is a detail sectional and diagrammatic view of the control valve for the horizontal actuator forming a part of the hydraulic circuits, and taken as indicated by the line 15—15 of Fig. 17;

Figs. 16 and 17 are side and left end views, respectively, of the valve structure of Fig. 15;

Fig. 18 is a detail sectional and diagrammatic view of the control valve for the vertical acuator, along the line 18—18 of Fig. 20;

Figs. 19, 20 and 21 are side, right end, and partial left end views, respectively, of the valve structure of Fig. 18;

Fig. 22 is an enlarged horizonal sectional view of the gate mechanism and its associated parts, taken as indicated by the line 22—22 of Fig. 1;

Fig. 23 is a vertical sectional view of the gate mechanism, along the broken line 23—23 of Fig. 22;

Fig. 24 is a diagram of the hydraulic circuits;

Fig. 25 is a schematic layout of the electrical control elements and various parts of the electrical control circuit;

Figs. 26 and 26A comprise a layout of the starter panel forming a part of the electrical circuits;

Figure 27:
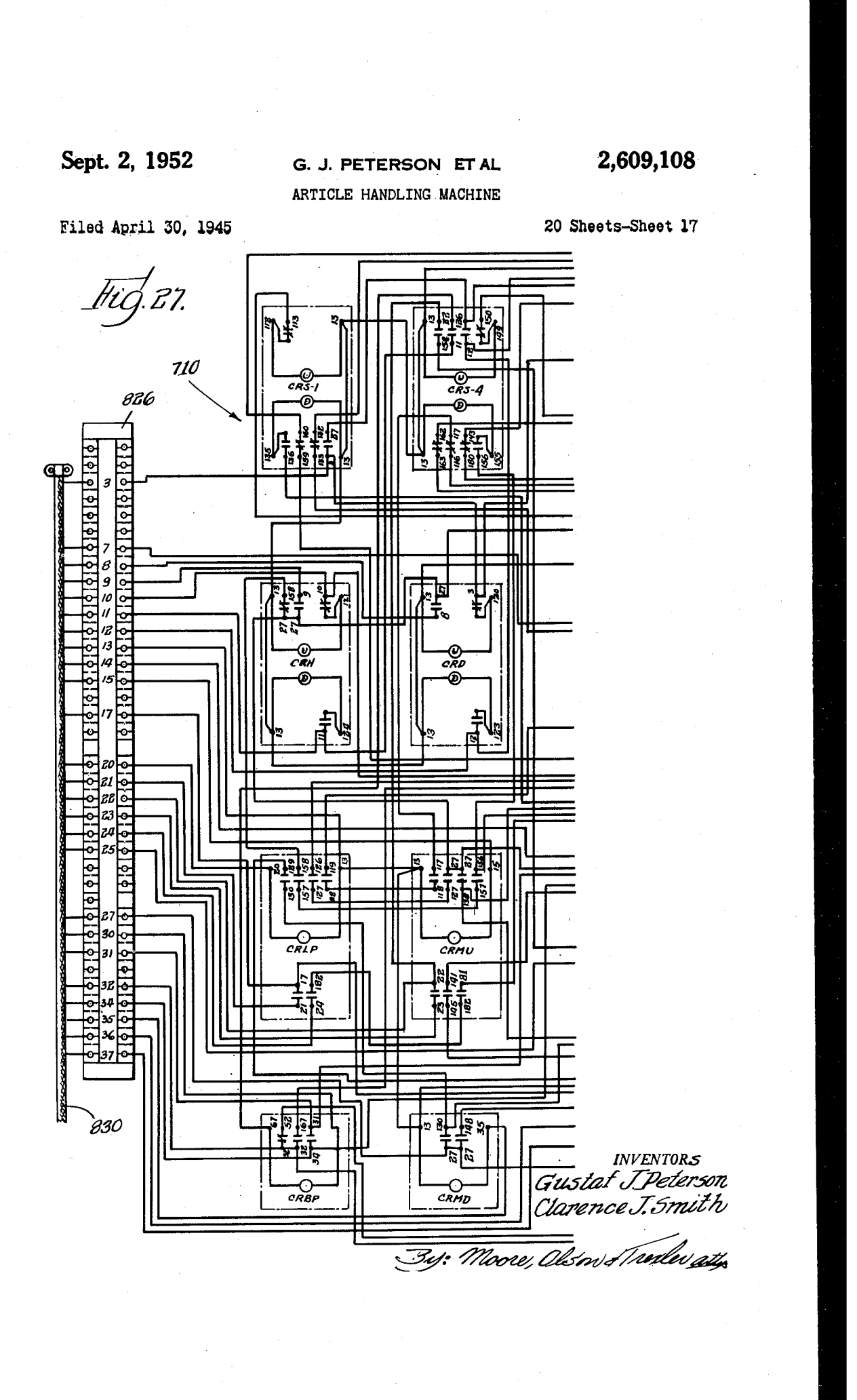

Figs. 27 and 27A comprise the layout of the relay panel; and

Figs. 28 and 28A comprise a line diagram of the complete electrical control circuits of the machine.

In the drawings the invention has been shown applied to a machine for loading metal cans into retort baskets in connection with the processing of the food contained therein, as the invention in certain of its aspects is particularly adapted for the handling of articles or objects of this general type. It is to be understood, however, that the invention, and various of its features and aspects, may be used for the handling of other types of objects and articles, in connection with the loading, unloading, manufacture, or processing thereof.

*General machine structure and summary of operation*

Referring more specifically to the drawings, and first to Figs. 1, 2, 3 and 4, the structure illustrated comprises a framework 200 formed of a series of rigidly connected pipes or bars, by which the various elements of the machine are supported in operative relationship.

The objects or articles to be handled by the machine, metal food containers or cans 204 in the particular embodiment illustrated, are introduced into the machine by means of a conveyor structure generally indicated by the numeral 206, the particular details of which form no part of the present invention, except in so far as they enter into combination with the other elements of the machine. This conveyor may be associated with and extended from a filling machine (not shown) wherein the cans are filled with a food product, or other material to be canned or processed.

In the particular embodiment disclosed, the handling machine of the invention is employed for loading the filled cans 204 into retort baskets, one such basket in can receiving position being indicated at 208, Figs. 1, 2 and 4, by means of which the cans may be taken to and deposited within steam retorts for processing or cooking of the contained food product. The cans are deposited within the baskets in layers, and after a basket has been filled with a predetermined number of layers, and with a predetermined number of cans in each layer, the loading operation automatically stops, and the loaded basket may be manually removed from the loading position shown in Figs. 1, 2 and 4, and a new basket to be filled inserted into position. To facilitate the withdrawal and replacement of the baskets, they may be disposed upon suitable dollies or trucks as indicated at 210, the machine framework 200 being cut away as perhaps best shown in Fig. 4, so that the dolly with the basket mounted thereon may be rolled into and away from the loading station of the machine.

From the supply conveyor 206 the cans are first delivered under control of a gate mechanism generally indicated by the numeral 212 onto a rotatable table 214. The gate mechanism counts the cans, and when a predetermined number of cans have been transmitted from the conveyor 206 onto the table 214, a hundred and thirty-eight cans in the particular embodiment disclosed, sufficient for one layer in the retort basket, the gate mechanism automatically closes a gate 216, Fig. 2, associated therewith, so that transmission of cans to the table is stopped.

The table 214 is provided with suitable operating mechanism, later to be described, and during the loading of the cans onto the table it is rotated at constant speed so as to aid in arranging the cans in position thereon, so that the requisite number is received. After the desired number of cans has been received onto the table, and the gate 216 closed, rotation of the table stops, and a magnet or translating member 218, Fig. 1, is moved downwardly into engagement with the tops of the cans, and current applied to the magnet so as to cause the cans to adhere thereto.

Magnet 218, which is circular in form and only slightly smaller than the table and the transverse area of the retort basket, is carried at the lower end of a translatable head structure, generally indicated by the number 220. The head is horizontally shiftable upon a pair of guide tracks 222 and 224, Fig. 2, carried by the frame of the machine, the head being propelled in its movements by means of a hydraulic cylinder 226 formed integrally with the head, and later to be described. By means of the tracks 222 and 224, and the hydraulic cylinder 226, the head 220 and the magnet 218 carried thereby may be shifted from a position as shown in Figs. 1 and 2, wherein the magnet is disposed over the retort basket, leftwardly into a position so that the magnet is brought concentrically above the table 214.

The head 220 also carries a vertical hydraulic actuator cylinder 228, Fig. 3, by means of which the magnet may be raised and lowered, in a controlled manner, in respect to the head.

By means of the hydraulic actuator 228 the magnet is raised, after the magnetizing current has been applied to the magnet and the cans caused to adhere thereto, thus lifting the cans from the table 214 and suspending them from the magnet structure. By means of the hydraulic actuator 226 the magnet is then translated into the position shown in Figs. 1 and 2, and the magnet then lowered to deposit the cans into the retort basket, to form a can layer therein. After the cans have been brought into proper position within the basket, the magnetizing current is released from the magnet, and the empty magnet then translated upwardly, horizontally, and then downwardly into engagement with and to withdraw a new layer of cans from the table 214.

During the movement of the magnet from the table 214 to the retort basket, and return, a new layer of cans has been passing through the gate 216, and formed on the table. The foregoing operations are repeated until the desired number of can layers have been loaded into the basket, whereupon the loading operations automatically are stopped, as previously indicated. Numerous interlocks and automatic controls are provided, for insuring the proper sequential operations, and the high speed controlled handling of the cans. These interlocks and controls will be later described.

*Table structure*

The table 214, and its drive mechanism, are best illustrated in Figs. 1, 2 and 3. As shown, the lower portion of the frame 200 carries an electric drive motor 230 and associated reduction gearing 232 arranged to drive a driving sprocket 234 whenever the motor is in operation. A driven sprocket 236 is driven from the sprocket 234 by means of a chain 238, the driven sprocket being secured to and arranged to drive a vertically disposed table drive shaft 240 journalled in a pair of frame bearings 242 and 244, and carrying the rotatable table 214 at its upper end. It will be seen that by reason of the described connections the table 214 may be driven, at a desired constant speed, whenever its driving motor 230 is energized. The energizing circuits for the motor 230 form a part of the electrical control circuits of the machine, and will be later described.

A circular band member 248 is disposed so that it lies very slightly outside of the periphery of the rotatable table, the lower portion of the band being substantially in the table plane, so that the band acts as a guide for holding the cans on the table during the loading operations. This band is supported by means of a series of brackets 250, Figs. 2 and 3, which are in turn supported by suitable angle plates 252 forming a part of the machine frame structure.

Translating head structure

The head structure 220 is shown in Figs. 1-4, and in greater detail in Figs. 5-10.

As best shown in Figs. 5, 6 and 7, the head 220 comprises a casing 254 forming a central chamber 256 and a pair of oppositely disposed reservoir chambers 258 and 260 interconnected by means of a cross channel 262, Fig. 6. The casing 254 forms a housing for the mechanism which interconnects the vertical hydraulic actuator with the lifting magnet and its support plate later to be described, whereas the interconnected reservoir chambers 258 and 260 are adapted to be filled through a suitable filling plug 264 with a quantity of oil which forms the actuating medium for the hydraulic system. The reservoir 260 encloses an oil pump 266 and certain interconnected oil conduits and valves which will later be more particularly described in reference to the hydraulic diagram, Fig. 24, and its mode of operation. The pump 266 is adapted to be driven by a drive shaft 268 powered from an electric motor 270, whenever the motor is in operation, the motor being superimposed onto the head casing 254, thus forming an integral part of the head structure. The actuating circuits for the motor form a part of the electrical structure of the machine, and will be later described.

The casing 254, together with a cover plate 272, forms a housing for a pair of valves 274 and 276 forming a part of the hydraulic circuits and provided, respectively, for controlling the functioning of the horizontal actuator 226 and the vertical actuator 228.

The details of the vertical actuator are best shown in Figs. 10 and 13. It will be seen that the actuator cylinder 228 is integrally secured at its lower end by suitable means, such as welding, to a flange plate 278; the latter being secured into clamping engagement with a flange plate 280 and onto the top of the casing 254 by a series of cap screws 282, Fig. 13. At its upper end the cylinder is welded to a sleeve 284 secured by means of suitable cap screws 286 to a cover plate 288 enclosing the upper end of the cylinder structure.

The plate 280 is provided with an upstanding bushing portion 290 forming a support for a packing assembly 292 for the piston rod 294 of the actuator. This piston rod carries a piston 296 at its upper end, and is secured at its lower end to a cross head 298, Fig. 5, operable within the head casing 254. An oil leakage and air pipe 300 runs longitudinally of the cylinder structure terminating at its lower end, Fig. 7, within the air space of the reservoir chamber 258 and above the normal oil level therein. The pipe 300 communicates at its upper end, Fig. 10, with a passage 302 leading into the cylinder adjacent the upper end thereof, and with a passage 304 and relatively small bleed passage 306 communicating with the cylinder interior adjacent its extreme upper end. An oil pressure supply pipe 308, Fig. 10, communicates with the lower end of the actuator cylinder by means of a passage 310 formed in the flange plates 280 and 278.

The cross head 298 is secured to a pair of connecting rods 312 and 314 connected at their lower ends to the magnet support plate 316.

It will be seen that by reason of the structure and connections provided, as oil under pressure is introduced through the pipe 308 and passage 310 into the lower end of the vertical actuator cylinder, the piston 296 will be raised, correspondingly raising the magnet support plate 316 and the magnet 218 carried thereby. Air and any oil leaking past the piston is returned to the oil reservoir through the pipe 300. As the piston approaches the upper end of its travel, it reaches a point wherein air exhaust through the relatively larger passage 302 is cut off, and thereafter the escaping air is constrained for passage through the relatively small bleed orifice 306. By this means the speed of travel of the piston is gradually slowed down or cushioned as the piston reaches the upper end of its stroke of travel, whereby to impart a smooth stopping action to the magnet support plate, and the magnet and articles supported thereby. Upon the release of oil pressure from the pressure supply pipe 308, the piston 296 may be returned to the lower end of the vertical actuator cylinder by the action of gravity, the oil being forced from the lower end of the actuator cylinder downwardly through the pipe 308, and the replacement air being introduced into the cylinder, above the piston, through the air pipe 300.

The connecting rod 314 carries a bracket 318 adapted to operate a limit switch 320 when the piston reaches its upper limit of travel. This limit switch forms a part of the electrical control circuits later to be described.

The horizontal actuator and track structures for guiding the head 220 in its horizontal movements are best shown in Figs. 5-7, and also Figs. 8 and 9. The lower portion of the casing 254 is secured by means of bolts 322, Fig. 7, to a saddle member 324. This saddle member is provided along its opposite side edges with a pair of cylinder or barrel portions 326 and 328 adapted to receive and slide along the horizontal guide rods or tracks 222 and 224, respectively. For this purpose each barrel portion is provided with a bearing sleeve 330 at its opposite ends and with a central reservoir portion 332 into which grease or other lubricant may be introduced by suitable means such as grease plugs 334. As previously indicated, the guide rods or tracks 222 and 224 extend horizontally of the machine at a slight angle, as best shown in Fig. 2. They are rigidly supported at their ends by means of brackets 335 in a pair of plate bars 336 and 338, Figs. 2, 3 and 4, forming a part of the machine frame structure 200 and disposed at the opposite machine ends. The frame plate 338 and its associated bar support brackets 335 are illustrated in enlarged detail in Fig. 8.

The saddle member 324 by means of its opposite end walls 340 and 342, Fig. 8, rigidly supports the elongated horizontal actuator cylinder 226. More particularly, the cylinder has welded thereto at a suitable point along its length, a flange member 344 which is adapted to be secured to the saddle end wall 340 by the cap screws 346 so as to rigidly fix the saddle and cylinder together as a structural unit.

The cylinder 226 is operable along a piston rod 348 provided substantially at its midpoint with a piston 350, and rigidly secured at its opposite ends to the frame plates 336 and 338 by means of a pair of cap brackets 352 and 354, respectively. Both of these cap brackets may be of the same construction, the cap bracket 354 and its associated connection with the right end of the piston rod being illustrated in Fig. 8. It will be seen that the end of the piston rod is reduced and threaded to receive a securing nut 356 adapted to bear against an intermediate barrier wall 358 formed internally of the cap bracket. A closure plate 360 secured to the bracket by cap screws 362 forms a chamber in the bracket within which is located an electric limit switch 364 having a plunger 366 adapted to be operated by the end of the cylinder as the head 220 reaches the limit of its movement to the right as seen in Figs. 1 and 2, wherein the magnet is located over the retort basket. A similar limit switch is provided within the cap bracket 352, operated as the horizontal-actuating cylinder reaches its extreme leftward movement to bring the magnet over the rotating table 214.

As best shown in Figs. 7 and 9, it will be seen that oil is supplied to and withdrawn from the actuator cylinder 226, as it is operated in opposite directions, by means of a pair of pipes 368 and 370, communicating, respectively, with passages 372 and 374 extending longitudinally of the cylinder structure. Passage 372 communicates with the cylinder adjacent its leftward end by means of a relatively large passage 376, and also by means of a more restricted or bleed passage 378. Similarly the passage 374 communicates with the rightward end of the cylinder by means of a larger or unrestricted passage 380 and a relatively smaller or restricted bleed passage 382.

To effect the horizontal actuation of the head, oil under pressure may be supplied to the pipe 370, thus supplying pressure oil to the right end of the actuator cylinder, and simultaneously propelling the oil from the left end thereof through the pipe 368, so as to cause the cylinder and the rigidly connected entire head structure 220 to be propelled to the right. The movement is relatively rapid until the escape passage 376 reaches the piston 350 and becomes closed thereby, after which the final movement of the cylinder progresses at a relatively slow or cushioned rate under control of the bleed passage 378. Similarly the introduction of pressure oil through the pipe line 368 causes movement of the actuator cylinder to the left, the exhaust oil from the right end of the cylinder passing upwardly through the pipe 370, and the movement being relatively rapid until the exhaust port 380 becomes closed by the piston 350 near the extreme limit of the travel, after which movement progresses at a slower or cushioned rate under control of the bleed orifice 382. By this means the head structure 220 is propelled horizontally in one direction or the other, the end movement in each direction being cushioned so as to minimize the transmission of shocks to the magnet and articles carried thereby. As will be understood, the opposite ends of the cylinder may be closed by end caps 384 and 386, Figs. 8 and 9, provided with suitable packings for slidably receiving the piston rod 348.

Magnet structure

The magnet support plate and magnet are best shown in Figs. 11, 12 and 14.

As previously indicated, the magnet support plate 316 is supported at the lower ends of the vertically disposed connecting rods 312 and 314. More particularly, these rods are reciprocable within suitably formed bosses 388 and 390 forming a part of the saddle 324, Figs. 8 and 14, and are provided at their lower ends with clamp nuts 392 by means of which the magnet support plate 316 is rigidly secured to the lower ends of the rods. As shown in Fig. 11, the magnet support plate is provided with a plurality of radially extending arms 394, four in number in the particular embodiment shown. Each of these arms has welded to its outer end a pair of cup members 396 and 398 arranged with the arm to form a series of brackets for supporting the magnet. Each of the four support brackets, and their associated parts, are preferably of duplicate construction. As shown, a washer 400 is carried by each support bracket, this washer having an upper spherically concave face for supporting the lower spherically convex face of a pair of lock nuts 402 which are threadedly fixed upon the reduced upper end of a magnet support bolt 404. The washer 400 lies loosely within a recess or chamber 406 formed at the upper end of the bracket, whereas a compression spring 408 is disposed within a lower smaller chamber in the bracket, the spring tending to urge the washer upwardly from its full line to its dotted line position, as seen in Fig. 14.

Each support bolt 404 at its lower end is journalled upon a bolt or cap screw 410 fixed into a pair of bosses 412 projecting upwardly from the upper face of the magnet 218.

The four compression springs 408 have insufficient strength to support the weight of the magnet 218, so that normally when the magnet is hanging free the weight of the magnet causes the springs to be compressed and the washers 400 to be in their lower seated position, as shown in full lines in Fig. 14. However, as the magnet is being lowered toward the table 214, and it engages the tops of the cans, or if the magnet is being lowered into the retort basket and the cans carried thereby engage the bottom of the basket or a layer of cans previously deposited into the basket; as the downward movement of the magnet is thereby arrested the springs 408 act to continue the downward movement of the support plate 316 and the associated actuator piston 296, whereby to cause the washers 400 to be moved into the dotted line positions shown in Fig. 14.

The expansion of the springs, and the movement of the washers 400 into their raised or dotted line positions causes the magnet 218 and its support plate 316 to be moved relatively toward each other. This movement is utilized to effect the actuation of a limit switch which signifies the fact that the magnet has reached the desired downward extent of its travel, either upon engagement with the cans on the table 214, when the magnet is lowered in its leftward or loading position, or as the cans carried by the magnet engage the bottom of the retort basket, or a previously loaded layer of cans, when the magnet is lowered in its rightward or unloading position into the retort basket. More particularly, the center of the support plate 316 is provided with an opening within which is mounted a limit switch 414 supported by a flange plate 416, said switch carrying a pivoted switch arm 418 adapted to engage a central table surface 420 on the magnet body, to operate the switch, when the magnet 218 and its support plate 316 are moved relatively toward each other. By this means it will be seen that, whereas the limit switch 320, Fig. 5, is operable invariably as the magnet reaches a predetermined upper position, the limit switch 414, for limiting the downward movement of the magnet, is operable at any desired lower level, as the weight of the magnet becomes supported by the objects engaged. By this means cans or articles of different size may be automatically handled, without adjustment of the machine. Also, the lower limit switch is automatically operable as the magnet reaches a proper position within the retort basket, regardless of the number of can layers which may have previously been deposited therein.

The spherical contact surfaces between the washers 400 and their supported nuts 402, together with the spacing 422, Fig. 14, provided between the cup members 396 and the support bolts 404, and the pivotal mounting of the support bolts upon the cap screws 410, cause the magnet to be swingably supported from its support plate, whereby to further minimize the possibility of transmitting shocks to the magnet as the head 220 is moved, and also permitting the magnet to properly seat itself into engagement with the cans. More particularly, the magnet body can assume a cocked or angular position as shown in the dotted lines of Fig. 14, if necessary to properly engage the can surfaces or the other objects to be raised.

For strengthening purposes, the magnet is provided with a series of radial webs 424, as best shown in Fig. 12. As will be understood, the magnet is provided internally with a series of electromagnet coils, diagrammatically indicated at 426, which upon energization cause the cans to adhere to the magnet face.

*Valve structure and hydraulic circuit*

The control valve 274 for the horizontal actuator 226 is illustrated in Figs. 15–17. The control valve 276 for the vertical actuator 228 is illustrated in Figs. 18–21. The hydraulic diagram for the actuators is shown in Fig. 24. The general piping layout of the hydraulic circuits is also shown in Figs. 5–7, particularly Fig. 7.

As shown in Figs. 5–7, and as previously described, it will be seen that the oil reservoir comprising the chambers 258 and 260, the pump 266 and its drive motor 270, the control valves 274 and 276, the horizontal actuator 226, the vertical actuator 228, and all intermediately disposed pipe connections and valves are carried as a part of the unitary head frame 220. By this means the use of flexible conduits and relatively movable or shiftable pipe connections is eliminated and avoided.

Referring to Fig. 24, oil is withdrawn from the reservoir 258—260 by means of a pipe or conduit 428 to the pump 266. The pump may for example be a gear pump, of the general type shown in the patent to Ernest J. Swenson, No. 1,912,737, operable at constant speed, whenever its drive motor 270 is in operation, to deliver a substantially constant volume of oil through its pressure outlet line 430. The conduit 430 is connected to a conduit 432 leading to a relief valve 434, and also to a conduit 436 leading to the control valve 274. The outlet of the relief valve 434 is connected to a drain line 438 returning to the reservoir. The relief valve 434 may be of any suitable type, for example as shown in the copending application of Gustaf J. Peterson, Serial No. 551,408, filed August 26, 1944, having a spring closed relief valve, the spring pressure being adjustable by means of an adjustment screw as indicated at 440, whereby to control the relief pressure. As will be understood, the relief valve automatically opens to relieve the pump discharge when the pump is in operation and the hydraulic actuators are at rest, or to relieve a part of the pump discharge when the actuators move at a reduced or restricted rate of travel.

Referring to Fig. 15, showing the details of the control valve 274, it will be seen that the valve comprises, in general, a main casing 442 having end caps or closures 444 and 446, a main reversing valve 448, a pair of pilot valves 450 and 452 for controlling the shifting of the main valve, and a pair of solenoids 454 and 456 operable, respectively, to control the shifting of the pilot valves.

More specifically, the valve port 458, Fig. 15, associated with the central portion of the bore 460 within which the valve member 448 is shiftable, is arranged to be connected to the inlet pressure supply pipe 436, Fig. 24; whereas the valve ports 462 and 464, also associated with the valve bore, are connected, respectively, to the pipes 368 and 370, Figs. 9 and 24, leading to the opposite ends of the horizontal actuator cylinder 226.

When the valve 448 is in its rightward position, as shown in Fig. 15, fluid from the supply pipe 436 is transmitted from the port 458 to port 462, and to the pipe line 368 to propel the actuator in one direction of travel. The return fluid from the actuator is returned through pipe line 370 to valve port 464, from which it is transmitted to a port 466, and thence through a valve conduit 468 connected with a drain line 470, Fig. 24, returning to the fluid reservoir. When the valve member 448 is shifted to the left end of the valve bore 460, the connections are reversed, the pressure fluid in this instance being transmitted from the port 458 to the port 464 and into the associated pipe line 370, so as to propel the actuator in the opposite direction. The return fluid from pipe 368 enters port 462 from which it is transmitted to a port 472, also connected with the valve conduit 468 leading to the drain line 470. It will thus be seen that the shifting of the valve is operative to cause the propulsion of the horizontal actuator, in one direction or the other, in accordance with the valve position, and at full traverse or cushioned rates of travel, as previously described.

To effect the shifting of the reversing valve 448, the pilot valves 450 and 452 are provided, both of which may be of the same construction. Normally these valves are urged by a compression spring 474 relatively away from each other or outwardly into engagement with a pair of actuating levers 476 and 478 associated, respectively, with the solenoid plungers 480 and 482.

A pair of valve ports 484 and 486 are interconnected with the pressure supply pipe 436, Fig. 24, so that they are continuously supplied with pressure fluid during pump operation. Normally, when the pilot valves are in normal position as shown in Fig. 15, the transmission of fluid from the ports 484 or 486 is blocked off. However, if solenoid plunger 480 is projected, by the energization of solenoid 454, the pilot valve 450 will be depressed inwardly interconnecting the port 484 with a port 488, the latter being interconnected with a valve passage 490 leading to the left end of the valve bore 460. This introduction of pressure fluid into the left end of the valve bore 460, hydraulically shifts the valve member 448 into its rightward position as shown in Fig. 15. When the solenoid is deenergized, the spring 474 restores the pilot valve 450 into its normal outward position, but the reversing valve member 448 remains in the position to which it has been actuated.

Similarly, energization of solenoid 456 causes the depression of pilot valve plunger 452, thereby interconnecting pressure port 486 with a valve port 492 connected to a valve passage 494 leading to the right end of the valve bore 460, so as to propel the reversing valve member 448 in the opposite direction.

The ports 488 and 492 are normally interconnected with a port 496 leading to a drain line 498, Fig. 24, so as to receive fluid from the bore 460 as the reversing valve is shifted. The pilot valve plungers are also provided with longitudinal passages 500 and 502 for directing leakage fluid which may tend to creep outwardly along the valve stems, to the drain port 496.

The means for controlling the energization of the solenoids 454 and 456 forms a part of the electrical circuits, later to be described.

A branch conduit 504, Fig. 24, leads from the supply pipe 436 through a check valve 506, of suitable construction, to the control valve 276 for the vertical hydraulic actuator. As shown in Fig. 18, this control valve comprises in general a main valve body 508 having end caps 510 and 512, a main control valve 514 shiftable within a valve bore 516, a pilot valve member 518, and certain mechanism associated with the valve cap 510 for controlling the speed of operation of the actuator and the speed of shifting of the valve member 514, as will presently be described.

More specifically, the valve casing 508 is provided with an inlet port 520 connected to the pressure supply conduit 504, this port being adapted to communicate with a port 522 connected to the vertical actuator supply pipe 308, when the control valve member 514 is in leftward or normal position, as shown in Fig. 18. The valve member is normally urged into its leftward position by a compression spring 524 seated within a recess in the valve member and reacting against the end plate 512. As has been previously described, the introduction of the pressure oil to the pipe 308 effects the lifting of the vertical actuator piston, at a traverse rate and then at a slower or cushioned rate as the piston reaches its upper limit of travel, for the purpose of raising the magnet 218 in a controlled and smooth manner. Due to the presence of the check valve 506, which prevents reverse flow through the conduit 504, even after the pump 266 has been stopped, if the vertical actuator piston has been raised it will remain in raised position so long as the control valve 514 remains in normal or leftward position, as shown in Fig. 18.

To effect the lowering of the actuator piston, the actuator supply conduit 308 is connected to drain, whereupon the actuator piston is lowered by gravity, as previously described. To effect the connecting of the conduit 308 to drain, the valve member 514 is shifted to the right against the action of the spring 524, so as to interconnect the port 522 with a port 526. This port is connected to drain through an orifice speed control mechanism which thereby controls the speed of lowering of the actuator piston. More particularly, port 526 interconnects with a valve passage 528 leading to a chamber 530. A plug member 532 having a tapered end portion as indicated at 534 communicates with the chamber 530 in such a manner that the tapered portion interconnects the chamber with a port 536 connected to a drain line 538, Fig. 24. The longitudinal position of the plug member 532 is controlled by a threaded adjustment screw 540 abutting the end of the plug member and threaded into a bore 542 in the end cap 510. Upon removal of a plug screw 544, the screw 540 may be rotated whereby to adjust the longitudinal positioning of the plug member 532 to thereby adjust the rate of escape of fluid from the chamber 530 to the drain line port 536. By this means the downward speed of the magnet, under the action of gravity may be readily adjustably controlled.

To effect the rightward movement of the control valve 514, against the action of spring 524, the pilot valve 518 is provided. This pilot valve is arranged to be depressed, or pushed inwardly, by means of a lever 546 adapted to be actuated by the outward thrust of the plunger 548 of an electric solenoid 550 forming a part of the electrical control circuits. A compression spring 552 normally urges the pilot valve plunger 518 into its outward or rightward position, shown in Fig. 18. The compression spring bears against the pilot valve and against a plug member 554 pinned in fixed position within the pilot valve bore 556. An inlet port 558 connected to the oil pressure supply pipe 504 is blocked when the pilot valve is in normal or outward position. When the solenoid 550 is energized, the pilot valve is depressed so as to interconnect port 558 with a port 560 connected with a valve passage 562. The passage 562 communicates unrestrictedly with a passage 563 and with a passageway 564 leading into the main valve bore 516, the rate of fluid flow between passages 562 and 564 being controlled by an adjustable needle valve 566. The longitudinal positioning of the needle valve may be adjusted, to control the flow rate, by means of the threaded end portion 568 of the valve, rendered accessible upon the removal of a cap plug 570.

It will be seen that by reason of the described connections, as the solenoid 550 is energized, introducing pressure fluid into the valve passage 562, the main control valve 514 will be shifted slowly to the right, under the control of the needle valve 566, until passage 563 is uncovered whereupon rapid movement will be imparted to the shiftable valve member. Similarly as the solenoid 550 is deenergized, and the spring 524 operates to return the control valve member 514 to its normal or leftward position, at a speed governed by the reverse rate of flow of the fluid exhausting from the valve bore through passage 562, rapid movement of the valve will be effected until the passage 563 becomes blocked, after which a slow rate of continued travel is imparted to the valve member under control of the needle valve 566. By adjusting the needle valve setting, the time lag in the restoring movement of the control valve 514, before communication is established between ports 520 and 522, may be adjustably controlled, whereby to allow adequate time for the building up or the release of the magnetic flux within the lifting magnet 218, before upward movement is imparted to the magnet. It will be understood, however, that in certain instances delayed operation may not be required, in which event the needle valve may be retracted to widely open position.

It will be seen that whereas the control valve member 448 of valve 274 remains in each of its actuated positions, until moved to a new position by the energization of one of its control solenoids, the control valve member 514 of the valve 276 remains in its rightward position only so long as the solenoid 550 remains energized. Immediately upon deenergization of the solenoid, the spring 524 becomes operative to restore the control valve member to its leftward position. During this restoring movement the exhaust fluid from passage 562 passes from port 560 to an exhaust port 572 connecting with a drain line 574, Fig. 24. Pilot valve 518 is provided with a central bore 576, as in the case of the pilot valves 450 and 452, for catching and exhausting leakage fluid.

The sequence of operation of the three valve control solenoids 454, 456 and 550 will be hereinafter described in reference to the electrical circuits.

*Basket station and positioning mechanism*

As previously indicated and as shown in Fig. 4, the main machine frame 200 is so arranged that the retort basket 208 may be readily pushed into its can receiving position beneath the magnet 218 when the latter is in its unloading position, to receive the cans therefrom.

To facilitate the accurate placement of the basket there is provided a pair of resilient arms 578, Figs. 1, 2 and 4, adapted to grip and position the basket body, the arms being resiliently spread as the basket is pushed into position. The arms are mounted on brackets 580 suitably supported from a pair of frame angle plates 582.

A switch member 584, Fig. 2, is fixedly mounted upon the machine frame in a manner so that the switch arm is depressed, and held depressed, while the basket remains in can receiving position between the support arms. This switch forms a part of the electrical control circuits and is utilized to determine when the basket is in proper position, and also at the end of a loading operation, to determine that the filled basket has been removed and an empty basket inserted, as will be later described.

*Conveyor structure and gate mechanism*

The conveyor and gate structures are shown in Figs. 1-4, the gate mechanism being shown in detail in Figs. 22 and 23.

As previously stated, any suitable conveyor structure may be employed. As shown, the conveyor comprises an endless belt 586, Fig. 2, extending from a suitable can loading station, such for example as a filling machine, and suitably driven from a source of power supply. The upper reach of the belt moves to the right in the direction of the arrow, Fig. 2, and passes over a pulley 588 fixed to a shaft 590 suitably journalled in the frame of the machine. The belt propels the cans between a pair of fixed guide rails 592 which constrain the cans for movement along a predetermined path of travel.

Shaft 590 carries a gear 594 meshing with a gear 596 fixed to a shaft 598 journalled in the frame of the machine, this latter shaft having fixed thereto a pulley 600 over which passes a second endless belt 602 the upper reach of which travels in the opposite direction. The guide rails 592 are so shaped as to cause the cans to be transferred from the belt 586 across a fixed support plate 604 onto the belt 602, this latter belt and its associated guide rails 606 being operable to propel the cans to the gate mechanism 212. The conveyor belts are preferably continuously driven, so that the cans are frictionally urged toward the gate mechanism at all times, the cans being permitted to move through the gate mechanism and onto the table 214, whenever the gate mechanism so permits, as will be presently described.

Referring to Figs. 22 and 23, it will be seen that the gate mechanism comprises in general, in addition to the gate 216, a star wheel 608 for blocking or permitting the flow of cans through the gate mechanism, a solenoid 610 for controlling the locking and releasing of the star wheel, a solenoid 612 for controlling the opening and closing of the gate 216, and a switch structure 614 operated in accordance with the movements of the star wheel so as to count the number of cans passing through the gate mechanism.

More specifically, the fixed frame structure of the conveyor carries a series of upstanding bolts 616, with associated sleeves 618, for fixedly mounting a support plate 620 in spaced relation to the conveyor structure, this support plate forming the support means for the gate mechanism. A vertically disposed shaft 622 is journalled adjacent its upper end within a bearing block 624 carried by the support plate, and adjacent its lower end within a bearing arm 626 formed as a part of the fixed conveyor frame structure. The lower end of this shaft has pinned thereto the two star wheel elements 608 which are so shaped, as shown in Fig. 22, as to conform to the cylindrical contours of the cans, causing the star wheel to be operated one step or one-seventh of a revolution, in the particular embodiment shown, as each can is moved past a star wheel structure.

The upper end of the shaft 622 has pinned thereto a polygonally shaped cam member 628 and a ratchet wheel 630. A switch arm 632 of the switch 614 bears against the cam member 628, the arrangement being such that the switch is operated once for each step of movement imparted to the star wheel as each can passes through the structure.

As will be later more particularly described in reference to the electrical circuits, the switch structure 614 is associated with a counter mechanism for controlling the energization and deenergization of the electromagnet 610. This electromagnet is mounted on support plate 620 by means of a pair of brackets 634, the magnet being provided with an armature or core member 636 arranged to be pulled toward the magnet, or shifted to the left as seen in Figs. 22 and 23, whenever the magnet is energized. The core member is connected by means of a pivot bolt 638 to a longitudinally shiftable lock shaft 640. This shaft is shiftable within a guide bracket 642 suitably secured to the support plate 620, and is pivotally connected at its end by means of a stud 644 to a pawl or locking arm 646 pivotally mounted upon the support plate 620 by means of a pivot pin as indicated at 648. The pawl arm is provided with a locking pawl or projection 650, the arrangement being such that when the pawl arm is in locking position, as shown in Fig. 22, the ratchet wheel 630, and resultingly the star wheel shaft 622 to which it is connected, are locked from movement. A compression spring 652 bears between the frame bracket 642 and a collar 654 pinned to the lock shaft 640, so as to urge the lock shaft and the associated locking arm 646 into ratchet locking position; the movement of the parts, under the urging action of the spring, being limited by a stop collar 656 pinned to the lock shaft.

During the time that the cans are passing through the gate mechanism onto the table 214, the electromagnet 610 is constantly energized, thereby pulling the lock shaft 640 to the left, as seen in Figs. 22 and 23, against the action of the spring 652, so as to maintain the locking arm 646 in release position, permitting free operation of the star wheel. After a predetermined number of cans have passed the star wheel, for example, one hundred and thirty-eight cans in the particular embodiment disclosed, and the switch 614 has been operated a corresponding number of times, the switch counter causes deenergization of the magnet 610, thereby permitting the spring 652 to act, locking the star wheel and blocking the further flow of cans through the unit.

The lock pin or shaft 640 carries a laterally projecting screw 658 which cooperates with a switch arm 660 forming a part of a switch mechanism 662 secured to the support plate 620, the arrangement being such that the screw depresses the switch arm to close the switch as the lock pin or shaft is moved to the right, under the urging action of the spring 652. The switch 662, by means of electrical circuits later to be described, controls the energization and deenergization of the gate control electromagnet 612. This electromagnet or solenoid is supported by means of an L-shaped bracket 664 hung from the support plate 620, and is provided with an armature or core 666, the arrangement being such that the core is projected through the solenoid, or to the right, as seen in Fig. 23, when the solenoid is energized. The core 666 is pivotally connected by means of a pin 668 to the inner end of a link 670, the outer end of which, as best shown in Fig. 22, is provided with an opening 672 adapted to receive an upstanding pin 674 carried by a bracket 676 formed as a part of the gate member 216.

It will thus be seen that as the lock shaft 640 is moved to the right, Fig. 22, to lock the star wheel, after the desired predetermined number of cans have been delivered to the rotating table 214, the switch 662 closes to energize solenoid 612 which thereby projects its armature 666 to the right, Figs. 22 and 23, so as to close the gate 216. During the loading of the cans onto the table, and prior to the energization of the solenoid 612, the gate 216 is held open by a compression spring 678 bearing at one end against the pivot pin 668 and at its other end against a cone shaped bracket 680 suitably supported on the front face of the bracket 664.

A switch 682, Fig. 22, is suitably supported upon the conveyor frame structure in a position so that an upstanding pin 684 carried at the end of the switch operating arm 686 is arranged to be actuated by the gate member 216 and a bracket 688 formed as a part of the gate member, as the gate is operated in opposite directions. It will be seen that the spacing between the bracket 688 and the body of the gate is greater than the diameter of the pin 684, a lost motion connection thereby being provided, so that the switch arm is operated in one direction near the end of the opening movement of the gate, and in the opposite direction near the end of the gate closing movement. The switch 682 forms a part of the electrical control circuits, for timing the stopping of rotation of the table 214, and the lowering of the magnet 218 into engagement with the cans on the table as will be later described.

The solenoids 610 and 612, and their associated parts, are enclosed respectively within housing or casing members 690 and 692, Fig. 23, carried by the support plate 620.

*Electrical control circuits*

The electrical control circuits comprise three push button panels 700, 702 and 704, Fig. 2, a terminal box 706, and two control panel boxes—a starter panel box 708, and a relay panel box 710 which, as shown in Fig. 25, may for convenience be disposed at a position remote from the machine. The push button panels 700 and 702 are disposed for operation by an operator adjacent the conveyor structure, and are arranged for effecting, respectively, automatic or hand operation of the machine. The push button panel 704 is disposed adjacent the basket station, for operation by the basket operator. The terminal box 706 contains the terminal panels by which the various wires of the system are interconnected. The starter and relay panel boxes 708 and 710 contain certain control apparatus, the function of which will be presently described.

Fig. 25 shows a general schematic layout of the control circuit. It will be seen that the circuit includes the Unloading Position LSUP (limit switch unloading position) switch 364 located within the cap bracket 354 and closed as the head structure 220 reaches its rightward or unloading position as previously described; the corresponding Loading Position LSLP (limit switch loading position) switch 712 disposed at the other end of the machine within the cap bracket 352 and closed as the head structure reaches loading position; the Basket Position LSBP (limit switch basket position) switch 584 closed by the positioning of the basket; the Magnet Up LSMU (limit switch magnet up) switch 320 closed when the vertical hydraulic actuator reaches uppermost position; the Magnet Down LSMD (limit switch magnet down) switch 414 closed when the vertical hydraulic actuator reaches its proper lowered position; the Magnet Down SADT solenoid 550 forming a part of the control valve for the vertical hydraulic actuator and which when energized effects a lowering of the actuator by gravity, as previously described; the Unloading Traverse SU (solenoid unloading) solenoid 456 forming a part of the control valve for the horizontal actuator and which when energized shifts the head structure 220 rightwardly or to its unloading position; the Loading Traverse SL (solenoid loading) solenoid 454 forming a part of the same valve structure and energized to shift the magnet carrying head leftwardly or to loading position; the magnetic coils 426 within the magnet structure 218; and the pump motor 270, all as previously described.

The circuit further comprises, as indicated in Fig. 25, the table rotating motor 230; the Cans Per Layer LSCRL counter actuating switch 614 operated by the can star wheel; the Lock Pin solenoid 610 for effecting the locking and unlocking of the can star wheel; the Lock Pin LSPI (limit switch pin in) switch 662 operated by the shifting of the star wheel locking mechanism control shaft or pin 640; the Gate solenoid 612 for controlling the opening and closing of the gate 216; and the Gate LSGO (limit switch gate open)

switch 682, operated in accordance with the gate position, and provided as shown in Fig. 25 with two mechanically connected switch members 714 and 716.

Referring further to Fig. 25 and to the details of the push button panels 700, 702 and 704, it will be seen that the automatic panel 700 comprises a Run lamp 718 which is lighted a predetermined time interval after the circuit has been connected to its power lines, indicating that the machine is ready for operation; an In lamp 720 lighted if a receiving basket 208 is properly positioned at the unloading station; a Cycle Start lamp 722 lighted after the Cycle Start push button on the basket handler's push button panel board 704 has been operated thus indicating that the machine is in its automatic cycle of operation; a Jog Magnet switch 724 operable to energize the pump motor 270 so long as the switch is held closed to raise the vertical actuator piston, whereby to insure that the can magnet 218 is in proper raised position before the machine cycle is started, as for example where the vertical actuator piston may have dropped down by leakage of fluid past the check valve 506 during the time that the machine is standing idle; a Run switch 726 operable after the Run light 718 becomes lighted, to energize certain control circuits and enable the Cycle Start push button on the basket handler's panel board to start the machine cycle; and a Stop switch 728 operable at any time to stop the machine cycle.

The manual push button panel board 702 comprises a Close switch 730 operable to control the gate solenoid 612 to close the gate 216; an Open switch 732 operable to open the gate; an On switch 734 operable to energize the can lighting magnets 426; an Off switch 736 operable to deenergize the can lifting magnets; an Auto-Hand switch 738 operable to condition the machine for automatic or hand operation; a Run switch 740 corresponding to the Run switch 726 on the automatic control board; a Reset switch 742 operable to reset all mechanically held relays, later to be described, to their down or normal position; a Start-H switch 744 operable to start the hydraulic or pump motor 270; a Stop-H switch 746 operable to stop the pump motor; a Stop switch 748 corresponding to the Stop switch 728 of the automatic panel board; an Up switch 750 for controlling the vertical hydraulic actuator control valve solenoid 550 to raise the can magnet 218; a Down switch 752 for lowering the can magnet; a Load switch 754 for controlling the horizontal hydraulic actuator control valve solenoid 454 to shift the can magnet to loading position over the table 214; an Unload switch 756 operable to energize companion solenoid 456 to shift the can magnet to unloading position over the receiving basket; and an Empty-Off-Fill selector switch 758 which when in "Fill" position controls the energizing of the can magnet 426 in a manner so as to transfer cans from the table 214 to the basket 208, when in "Empty" position controls the energizing sequence for the magnet so as to transfer cans in a reverse manner from the basket 208 to the table 214, and when in "Off" position prevents energization of the magnet.

The panel board 704 at the basket handler's station comprises a Cycle Start lamp 760 corresponding to the Cycle Start lamp 722 on the panel board 700; an In lamp 762 corresponding to the In lamp 720 of the panel board 700; a Cycle Start push button 764 operable to start the machine cycle after the Run push button 726 on the operator's panel board 700 has been depressed; and a Stop switch 766 corresponding to the Stop switches 728 and 748 previously described.

The control elements provided within the starter panel box 708 are illustrated in detail in Figs. 26 and 26A. As shown, the starter panel comprises a main switch 768 for connecting the circuit with the power lines L-1, L-2 and L-3 adapted to be connected to a suitable source of alternating current power supply, a 440-volt power source in the particular embodiment set forth. A transformer 770 is provided with a 440-volt primary and a 110-volt secondary so that the various elements of the system may be operated either at the higher voltage or lower voltage, as may be required. Three power lines as indicated at 772 are tapped from the supply lines L-1, L-2 and L-3, under control of the main switch 768, these lines leading to a rectifier as diagrammatically indicated at 774, Fig. 25, which may be of any suitable conventional construction for transforming alternating to direct current. The D. C. output lines 776 from the rectifier, providing a 115-volt D. C. power source in the particular embodiment disclosed, are connected to a terminal board 778, as shown.

The starter panel further includes a Hydraulic Motor Starter 780 having an MSH (motor starter hydraulic) coil 782 which when energized closes MSH contacts 784 to connect the pump motor 270 to the power supply; and a Table Motor Starter 786 having an MST (motor starter table) coil 788 which when energized closes MST contacts 790 to connect the table motor 230 to the power supply. These motor starters are provided with overload and heat control safety switches, as indicated at 792, as will be understood.

The starter panel further includes a Cans Per Layer counter CRCRL for counting the cans delivered to the table 214, operable by the Cans Per Layer LSCRL can operated switch 614. More specifically, this counter comprises a counter coil 800 energized at each closing of the can switch LSCRL, the counter coil being operable to actuate a pawl and ratchet stepper counting mechanism (not shown) which may be of any suitable conventional construction. When the counter ratchet wheel reaches a predetermined position (viz., when the counter coil has been actuated one hundred and thirty-eight times in the particular embodiment disclosed) the ratchet closes the counter switch 802, operable to effect certain control functions, as will presently be described. The CRCRL counter also includes a reset coil 804 which when energized withdraws a holding pawl from the counter ratchet, whereupon the ratchet wheel is spring restored to zero position, as is conventional in pawl and ratchet counting mechanisms.

Similarly the starter panel includes a Layers counter CRCRF for counting the number of can layers delivered to the receiving basket. This counter includes a counter coil 806 energized each time a layer of cans is delivered to the basket 208, and operable to effect the actuation of a conventional pawl and ratchet (not shown) similar to the counter mechanism CRCRL, just described. When the ratchet wheel reaches a predetermined position, corresponding to the desired number of can layers in the receiving basket, a switch 808 is operated, to effect certain control functions presently to be described. The counter further includes a reset coil 810 which when energized releases the holding pawl from the ratchet wheel, which is thereupon spring returned to zero position.

A Totalizer counter mechanism CRCRT, Fig. 25, is provided in the terminal box 706. This counter is also operated by the can actuated switch LSCRL, and is associated with pawl and ratchet counting mechanism, and indicating means (not shown) for indicating the total number of cans handled by the machine.

Referring further to Figs. 26 and 26A, the starter panel also includes six relays as indicated, respectively, at CRM, CRMT, CRMTX, CRRC, CRCRFX and CRTT. The detailed functioning of these relays will be later described in connection with the line diagrams of Figs. 28 and 28A. However, it may be said that the broad or general functions and characteristics of these relays are as follows:

Master relay CRM (control relay master) is a master control relay for energizing various machine circuits, so that the machine cycle of operation may be effected. It is provided with five normally open contacts, as shown, which are closed upon energization of the relay coil 812 and remain closed so long as the coil remains energized.

Slow acting Timer relay CRMT (control relay magnet timer) is provided for insuring a predetermined time interval, after energizing the electrical circuits and before starting the machine cycle, so as to facilitate the proper functioning of the can magnet coils 426. It is provided with one normally open contact, as shown.

Timer Auxiliary relay CRMTX (CRMT auxiliary) provided with one normally open contact, is auxiliary to relay CRMT, and functions in connection therewith.

Counter relay CRRC (control relay start counting) functions in connection with the Cans Per Layer counter CRCRL. It is provided with four normally open contacts and three normally closed contacts, as shown. This relay is of the two-position, mechanically held, type; viz., when its up coil 814 is energized its normally closed contacts are opened, and immediately thereafter its normally open contacts are closed. After deenergization of the up coil, the contacts remain in their actuated positions by mechanical toggle action, until energization of the relay down coil 816, whereupon the normally open contacts are restored to open position, and immediately thereafter the normally closed contacts are closed, viz., the relay is "reset" to normal condition.

The Layers relay CRCRFX (CRCRF auxiliary) functions in connection with the Layers counter CRCRF. This relay is provided with one normally open contact and one normally closed contact as shown.

The slow acting Table Timer relay CRTT (control relay table timer) functions to control the timing, in the starting and stopping of the rotation of the table 214. The relay is provided with one normally closed contact as shown.

The starter panel still further includes a D. C. Magnet Current relay CRDCC (control relay direct current) having two coils CRDCC-1 and CRDCC-2, respectively, each controlling one normally open contact as shown, and functioning in connection with the energizing of the lifting magnet coils 426.

The starter panel also includes a discharge resistor 818 connected in parallel with the lifting magnet 426. This discharge resistor absorbs the current generated by the voltage resulting from the deenergization of the magnet, so as to protect and prevent undue current surges in the system.

It will be noted that the wires and connections associated with the various control elements in Figs. 25, 26 and 26A all bear numerals (below 200). These numerals are duplicated in the line diagrams, Figs. 28 and 28A, which will be referred to and described in the operation of the system, so that corresponding parts may be readily identified. As will be understood, identically numbered wires, whether located in the machine parts, the starter panel 708, or the relay panel 710, are all interconnected through the terminal box 706. Thus, referring to Figs. 25, 26 and 26A, it will be seen that the starter panel is provided with terminal boards 778 and 822, the various designated contacts of which (with the exception of line DCL-2) are interconnected by means of a cable 824 with the terminal board 825 of the terminal box 706. Similarly the designated contacts on the terminal boards 826 and 828 of the relay panel 710 are interconnected by means of the cable 830 with the terminal box panel. The interconnections between the terminal box panel 825, and the various wires on the machine structure are not illustrated to avoid confusion. The cable interconnecting the terminal box and the traveling head structure 220 is, however, illustrated at 832, in Fig. 4.

Referring to Figs. 27 and 27A, it will be seen that the relay panel includes some twenty relays bearing designations as indicated. Relays CRS-1, CRS-2, CRS-3, CRS-4, CRDC, CRH, CRD, CRCS and CRBO are of the double coil mechanically held type, as shown, similar to the relay CRRC of the starter panel, previously described. The remaining relays of the relay panel are simple relays, the contacts of which remain actuated only while the relay coil remains energized.

The detail functioning of the various relays will presently be described in connection with Figs. 28 and 28A. However, the general functions of the relays may be summarized as follows:

Step relay CRS-1 (control relay step one) provided with two normally open contacts and three normally closed contacts, Step relay CRS-2 provided with four normally open contacts and four normally closed contacts, Step relay CRS-3 provided with two normally open contacts and four normally closed contacts, and Step relay CRS-4 provided with four normally open contacts and four normally closed contacts are control relays functioning to secure the proper sequential steps of operation in the automatic cycle of the machine.

Magnet Current relay CRDC (control relay direct current) having four normally open contacts and two normally closed contacts functions to control the energization of the lifting magnet coils 426.

Hydraulic relay CRH (control relay hydraulic) provided with two normally open contacts and two normally closed contacts functions in connection with the control of the hydraulic pump motor 270.

Magnet Start Down relay CRD (control relay down) provided with two normally open contacts and one normally closed contact functions in connection with the lowering of the cam lifting magnet 218.

Automatic Operation relay CRAO (control relay automatic operation) provided with six normally open contacts functions in connection with the conditioning of the system for automatic operation.

Automatic Operation Auxiliary relay CRAOX (CRAO auxiliary) provided with four normally open contacts, is auxiliary to relay CRAO for providing additional contacts functioning simultaneously therewith.

Cycle Start relay CRCS (control relay cycle start) provided with three normally open contacts and three normally closed contacts functions in connection with the Cycle Start push button 764, in connection with the starting of the automatic cycle.

Basket Out relay CRBO (control relay basket out) provided with two normally open and two normally closed contacts functions in connection with the removal of the basket 208, after it has been filled.

Loading Position relay CRLP (control relay loading position) provided with six normally open contacts functions in connection with the shifting of the head structure 220 so as to bring the lifting magnet to loading position, over the table 214.

Magnet Up relay CRMU (control relay magnet up) provided with seven normally open contacts functions in connection with the raising of the lifting magnet.

Hand Operation relay CRHO (control relay hand operation) provided with five normally open contacts functions in connection with the conditioning of the machine for hand operation.

Hand Operation Auxiliary relay CRHOX (CRHO auxiliary) provides four additional normally open contacts, functioning with relay CRHO.

Reset Relay CRR (control relay reset) provided with six normally open and one normally closed contacts functions in connection with the resetting of the mechanically held relays, or restoring of these relays to normal position, such as may be required to restore the system to normal, if the machine has been stopped in the middle of its cycle.

Reset Auxiliary relay CRRX (CRR auxiliary) provides an additional normally closed contact functioning with relay CRR.

Basket Position relay CRBP (control relay basket position) provided with two normally open and one normally closed contact, functions in connection with the positioning of the basket 208, and the associated Basket Position switch structure LSBP, viz., switch 584, as previously described.

Magnet Down relay CRMD (control relay magnet down) provided with two normally open contacts functions in connection with the lowering of the lifting magnet.

Unloading Position relay CRUP (control relay unloading position) provided with three normally open contacts, functions in connection with the lateral shifting of the head structure 220 so as to bring the lifting magnet into unloading position over the can receiving basket 208.

Operation

Reference will be made to Figs. 28 and 28A in describing the operation of the machine. These figures comprise a line diagram for the entire system, the various connections and parts corresponding to those shown in Figs. 25, 26, 26A, 27 and 27A, bearing identical designations. The mechanical interconnection between the parts of the Auto-Hand switch is indicated by the line 834. The interconnection between the two LSGO Gate switches is indicated by the line 836.

Let it be assumed that the conveyor belts 586 and 602 are stationary; that the gate 216 is open and the star wheel 608 unlocked; that the head structure 220 is in its leftward or loading position over the table 214, and that the lifting magnet 218 is in its up or raised position (this is the normal position of the head and magnet and will be referred to as the "home" position); that the table motor 230 and pump motor 270 are idle; and that the previously filled receiving basket has been removed and a new basket 208 to be filled has been placed properly in position at the receiving station.

To initiate automatic operation the operator first shifts the Auto-Hand selector switch 738, Fig. 25, to "Auto" position, and the Empty-Off-Fill selector switch 758 to "Fill" position. The main circuit energizing switch 768, Fig. 28A, is then closed energizing the high voltage A. C. circuits, as well as the low voltage circuits through the action of the transformer 770, and the D. C. circuits through the intermediary of the rectifier 774.

Upon the closing of main switch 768 a circuit is established from the secondary of transformer 770 through connections 174 and 67 to the slow acting Timer relay coil CRMT, and through the coil and back to the transformer through connections 32 and 175. After a predetermined time interval, sufficient to permit the proper functioning of the tubes in the rectifier, the slow acting timer relay coil picks up or closes its normally open contacts between connections 65 and 32. A circuit is thereby established from the transformer through connections 174 and 67 to the Run lamp 718, and from the lamp through connections 65, 32, and 175 back to the transformer, whereby to indicate to the operator that the machine is in condition for operation.

The operator now actuates the Run push button 726 on the automatic push button panel. This completes a circuit from the transfer through connections 174 and 67 to the Master relay coil CRM. From the coil the current passes through connections 171, 172, 34, a set of normally closed Cycle Start CRCS contacts, connection 31, the "Auto" contacts of the Auto-Hand switch, connection 69, the closed Run switch 726, connections 69, 78, 2, 65, 32, and 175 back to the transformer. The Master CRM relay thereupon closes its several sets of normally open contacts. One set of these contacts establishes a holding circuit around the Run push button 726 between connections 60 and 69. Two other sets of these contacts connect wires 67 and 13 and wires 27 and 32, respectively. It will thus be seen that whereas wires 67 and 32 are energized directly from the transformer whenever the main switch 768 is closed, the wires 13 and 27 are energized only while the Master CRM relay remains energized. Certain of the relay circuits are directly connected across the wires 67 and 32, whereas others performing in the operating cycle and requiring CRM relay protection, are connected across the wires 13 and 27. The CRM relay provides under voltage protection, in that if the voltage of the system drops below a predetermined minimum, the CRM relay will drop out and stay out, breaking the holding circuit; or if the motor protectors 792 open, the relay circuit will be broken.

As lines 13 and 27 become energized, a circuit is established through the Table Motor Starter coil MST, Fig. 28, through connection 186 and the normally closed contacts of the Table Timer relay CRTT, whereby to close the MST contacts in the 440-volt circuit, Fig. 28A, and start the operation of the table 214. Various other relay circuits are picked up either as lines 67 and 32 become energized upon the closing of the main switch 768, or as lines 13 and 27 become energized upon the operation of the CRM relay. The conditions of these circuits will be referred to, as they become material in the operating cycle.

If a previously filled basket has been removed, and a new basket to be filled properly placed in position at the basket station, the Basket Out relay CRBO will be in its up condition, and the Basket Position relay CRBP will be energized as will be later described. Accordingly if basket conditions are proper, immediately upon the closing of the main switch 768 and the energization of the lines 67 and 32, a circuit is established from line 67 through the two In indicator lamps 720 and 762, Fig. 28A, through connection 72, a closed set of CRBO contacts, connection 167, and a closed set of CRBP contacts to line 32, whereby to indicate both to the machine operator and the basket handler that receiving basket conditions are proper.

The basket handler now operates the Cycle Star push button 764. A circuit is thereby established from line 67 through the up coil of the Cycle Start relay CRCS, Fig. 28A, connection 166, a set of normally closed CRCS contacts, connection 75, the Cycle Start push button 764, connection 72, and thence through the aforesaid CRBO and CRBP contacts to the line 32. It will be seen that the Cycle Start relay cannot be energized unless proper basket conditions prevail; and also unless the CRCS relay was originally in its normal down position so that its contacts between connections 166 and 75 were closed. Similar relay position checking means is employed throughout the system. The picking up of relay CRCS by its up coil causes one set of its normally open contacts between connections 76 and 32 to close, whereby to energize the Cycle Start lamps 722 and 760 to indicate to the operator and basket handler that the machine cycle has started. As relay CRCS is picked up, its contacts between connections 34 and 31 are broken in the Master CRM relay circuit, but the CRM relay will not be dropped out if a basket is properly in position as the CRBP contacts between connections 34 and 31 will in such event be closed.

Assuming that the conveyor belts 586 and 602 are now started, the cans will be transmitted through the unlocked star wheel, through the open gate 216, and onto the rotating table 214. As the star wheel is operated by the cans, the Cans Per Layer LSCRL switch 614 is closed, once for each can, whereby, through connections 6 and 57, and a set of normally closed contacts of the Counter relay CRRC, to sequentially energize the counter coil 800 of the Cans Per Layer counter CRCRL, as well as the counter coil of the main Totalizer counter CRCRT located in the terminal box 706.

After a predetermined number of cans have been counted, one hundred and thirty-eight in the particular embodiment disclosed, the CRCRL counter closes its switches 802, Figs. 26A and 28, as previously described. This closes a circuit between wires 67 and 32 through connections 190, 1, and 32, and a set of normally closed CRRC contacts, whereby to pick up the Counter relay CRRC through its up coil.

The picking up of the Counter relay CRRC causes one of its normally open sets of contacts to close between connections 62 and 27, thus establishing a circuit to the reset coil 804 of the Cans Per Layer counter CRCRL, resetting the counter as previously described. The picking up of relay CRRC also causes, by the opening of one of its normally closed sets of contacts in the 440-volt circuit between connections L-1 and 188, the deenergization of the normally energized Lock Pin solenoid 610, Fig. 28A. As will be understood, this solenoid was energized and maintained energized, upon the closing of the Master relay CRM, through connections 188, 58 and 80, and the set of CRM contacts between connections 188 and 58. The circuit goes through the LSGO Gate switch 714 which is closed, as shown in Fig. 28A, when the gate 216 is in open position.

Deenergization of the Lock Pin solenoid permits the spring 652 to act to effect the locking of the can star wheel, thus blocking the further movement of cans notwithstanding the operation of the conveyor belts, which preferably remain continuously in operation after they have been started.

The shifting of the lock pin or shaft 640, as the star wheel is locked, closes the LSPI Lock Pin switch 662, as previously described. The closing of this switch establishes a circuit through the Gate solenoid 612 between the 440-volt lines L-1 and L-3, through connections 4 and 5 and through a set of now closed CRRC contacts. The energization of the Gate solenoid effects the closing of the gate 216, against the action of compression spring 678, the gate being held closed so long as the solenoid remains energized.

As the gate is closed, the LSGO Gate switch 714, Fig. 28A, is opened and the LSGO Gate switch 716, Fig. 28, is closed. The opening of switch 714 insures that the Lock Pin solenoid 610 cannot again be energized to unlock the can star wheel, so long as the gate 216 remains closed. The closing of switch 716 effects the energization of the Table Timer relay CRTT through connections 66 and 62, and a set of now closed CRRC contacts.

The energization of slow acting relay CRTT, after a predetermined time delay opens its normally closed contacts between connections 186 and 27, thus deenergizing the Table Motor Starter MST, stopping the rotation of the table 214. The relay is so timed that the table rotates long enough after the closing of the gate to properly position the cans on the table surface. This time, however, is relatively short so that the table will be stopped before the lifting magnet 218 (which, as will be presently described, starts downwardly as the gate is closed) reaches the table surface.

The closing of switch 716 picks up the Step relay CRS-1 by its up coil, through the connections 112—119, 66 and 62, provided that a number of prerequisite conditions are present. Thus the CRS-1 relay must be in its down condition, so that its normally closed contacts between the connections 112 and 113 are closed. The Cycle Start relay CRCS must be picked up establishing contact between connections 113 and 114. The three Step relays CRS-2, CRS-3 and CRS-4 must all be in their normal or down position so that their normally closed contacts establish connections 114—117. The CRMU Magnet Up relay, the CRLP Loading Position relay, and the CRAO Automatic Operation relay must also all be picked up establishing contact between connections 117, 118, 119 and 66. If the parts are in proper position, these three latter relays were picked up at the time current was connected to the wires 13 and 27 by the Master relay CRM. Thus it will be seen that the Magnet Up relay CRMU, Fig. 28A, was energized through connection 15 and the closed Magnet Up LSMU switch 320, closed because the vertical hydraulic actuator was in its raised position. The Loading Position relay CRLP was energized through connection 20 due to the fact that the LSLP Loading Position limit switch 712 was closed, the head structure 220 being in its leftward or loading position. The CRAO Automatic Operation relay, Fig. 28, was energized through connection 14, due to the fact that the Auto-Hand switch 738 was in "Auto" position. It will thus be seen that the head structure 220 must be in loading position with the lifting magnet raised, and the gate 216 closed, before the Step relay CRS-1 can be picked up.

The picking up of Step relay CRS-1 causes the Hydraulic relay CRH, Fig. 28, to be picked up by its up coil through connections 121, 10, 3 and 27, this circuit extending through a set of normally closed CRH contacts to check the position of the CRH relay, and a set of Automatic CRAO contacts, closed inasmuch as the machine is set for automatic operation. The energization of the CRH relay causes the energization of the Hydraulic Motor Starter MSH, Fig. 28, through connection 9, whereby to close the MSH contacts in the 440-volt circuit and start the hydraulic motor 270.

The picking up of the Step relay CRS-1 also causes the Magnet Start Down relay CRD to be picked up by its up coil through connections 120, 3 and 27. The picking up of relay CRD causes the Magnet Down SADT solenoid 550 associated with the control valve for the vertical actuator to be energized through connection 8, so that notwithstanding the starting of the hydraulic motor, the vertical actuator piston will be moved downwardly by gravity to lower the can lifting magnet. As previously brought out, normally and when the solenoid SADT is not energized, the vertical actuator control valve is positioned so that the check valve 506 maintains the lifting magnet in its uppermost position.

As the lifting magnet starts down, the Magnet Up LSMU switch 320 is opened breaking the circuit through connection 15 and deenergizing the Magnet Up relay CRMU. As relay CRMU drops out, it breaks the circuit between connections 117 and 118 in the circuit of the up coil of the CRS-1 Step relay. However, inasmuch as this relay is of the mechanically held type, it remains in its up or operated position.

As the lifting magnet 218 engages the top of the cans on the table, the continued downward movement of the vertical hydraulic actuator piston and its connected magnet support plate 316 causes the closing of the LSMD Magnet Down switch 414, as previously described. The closing of this switch picks up the Magnet Down relay CRMD through connection 35.

The energization of the Magnet Down relay CRMD causes the picking up of the Magnet Current relay CRDC, Fig. 28, through its up coil, by establishing a circuit through connections 128, 84, 129, 130 and 27. It will be noted that this circuit is completed through a set of normally closed CRDC contacts, thus testing the preconditioning or setting of the CRDC relay. The circuit also passes through a set of now closed Automatic Operation CRAO contacts and Loading Position CRLP contacts, thus testing that the machine has been set for automatic operation and that the lifting magnet is in its leftward or loading position.

As the Magnet Current relay CRDC is picked up its contacts between connections 83 and 85 close a circuit in the direct current portion of the system, Fig. 28A, between DCL-2 and DCL-1 through connections 185, 83 and 85, whereby to energize the D. C. Magnet Current relay coils CRDCC-1 and CRDCC-2. It will be noted that this circuit goes through the contacts of the Timer Auxiliary relay CRMTX, which relay was energized through connection 65 upon the closing of the Timer relay contacts CRMT, upon the operation of the Timer relay when the system was originally energized. By this means it will be seen that the CRDCC-1 and CRDCC-2 relay coils cannot be energized until the Timer relay has operated and the D. C. rectifier is in proper operating condition. It will be further seen that this energizing circuit for the CRDCC-1 and CRDCC-2 coils passes through the "Fill" contacts of the Empty-Off-Fill switch 758, so that the coils cannot be energized, at this time in the cycle, unless the switch is in its "Fill" position.

The energization of the CRDCC-1 and CRDCC-2 relay coils effects the closing of their CRDCC-1 and CRDCC-2 contacts, thereby effecting the energization of the lifting magnet coils 426 through connections 178 and 177, the energizing current also passing through blowout protectors 838 and 840. As previously described, the discharge resistor 818 is connected in parallel with the lifting magnet coils, to absorb and minimize current surges in the D. C. system, as the lifting magnet is deenergized. The energization of the lifting magnet causes the cans to adhere thereto.

The energization of the Magnet Current relay CRDC also causes the Step relay CRS-1 to be reset, this action being effected by the closing of the CRDC contacts between connections 134 and 129 whereby to energize the down coil of the CRS-1 relay, Fig. 28, through connections 135, 136, 134, 129, 130 and 27. It will be noted that this circuit passes through a set of previously closed CRS-1 contacts, thus testing the condition of the CRS-1 relay. More particularly, it will be noted that in the case of each mechanically held relay, the up coil circuit includes a normally closed contact of the relay, and the down coil includes a normally open contact of the relay. These contacts thus check the relay position, prior to the operation of either coil, and also open the operating coil circuit as the relay is shifted. The circuit of the down coil of the CRS-1 relay also passes through a set of normally closed contacts of the Reset relay CRR, which, as later described, is normally deenergized during the operating cycle of the machine. The circuit further passes through Loading Position CRLP contacts and Magnet Down CRMD contacts, both of which will be properly closed because the lifting magnet is in its loading position over the table 214, and lowered.

As the Step relay CRS-1 is restored to its down position its contacts between connections 132 and 133 effect the picking up of Step relay CRS-2 through its up coil, and through connections 131, 132, 133 and 134, 129, 130, and 27, these connections including a set of contacts, now closed, of the Automatic Operation relay CRAO.

As Step relay CRS-2 is picked up, Magnet Start Down relay CRD is actuated through its down coil to reset position, through connections 123, 12 and 27. These connections include a closed set of CRD contacts, so as to check the position of the CRD relay, and also open the down coil circuit, upon shifting of the relay, as above described.

The resetting of the CRD relay opens the circuit through connection 8 to the Magnet Down SADT solenoid 550 permitting the valve spring 552 to shift the pilot plunger 518 outwardly, relieving the hydraulic pressure at the leftward end of the main valve 514. This permits the valve spring 524 to shift the main valve leftwardly as seen in Fig. 18, but with a time delay action due to the needle valve 566, as previously described, so as to insure the building up of the magnetic flux of the lifting magnet before the shifting of the valve is completed, and the magnet moves.

As the lifting magnet starts up, the LSMD Magnet Down limit switch 414 is opened, thus breaking the circuit through connection 35 and deenergizing the Magnet Down relay CRMD.

As relay CRMD is deenergized, the circuits to the up coil of the Magnet Current relay CRDC, the up coil of the Step relay CRS-2, and the down coil of the Step relay CRS-1 are all broken by the breaking of the circuit between connections 130 and 27, the relay contacts, however, remaining in position inasmuch as these are all mechanically held relays.

As the lifting magnet 218 reaches its uppermost position, the Magnet Up LSMU limit switch 320 is closed reenergizing the Magnet Up CRMU relay through connection 15. This causes the energization of the down coil of the Counter relay CRRC, Fig. 28, through a circuit including connections 189, 24, 182, 81, 183 and 32. It will be noted that this circuit includes the Loading Position relay contacts CRLP, thus checking that the lifting magnet is still in loading position over the table. The circuit also includes and is checked by a set of contacts of Step relay CRS-2, which are still in closed position.

The resetting of Counter relay CRRC opens the circuit between connections 62 and 27, Fig. 28, thus deenergizing the reset coil 804 of the Cans Per Layer counter CRCRL, and also opening the circuit to and thus deenergizing the Table Timer relay CRTT. As relay CRTT drops out, its normally closed contacts reestablish a circuit through connection 186 to the Table Motor Starter MST, thus restarting the table motor. It will thus be seen that the table motor is restarted and, as will presently be described, a new batch of cans is introduced onto the rotating table, beginning immediately as the lifting magnet with the first layer or batch of cans reaches its raised position, and continuing as the magnet is moved into and returned from the receiving basket 208.

More specifically, as the Counter relay CRRC is reset, it also breaks the 440-volt circuit through connections 4 and 5, thus deenergizing the Gate solenoid 612, permitting spring 678 to open gate 216. As the gate is opened the LSGO Gate switch 714 is closed and the LSGO Gate switch 716 is opened. The closing of switch 714 again energizes the 440-volt circuit through connections 188, 58 and 80 whereby to energize the Lock Pin solenoid 610, unlocking the star wheel against the action of spring 652. The movement of the locking mechanism opens the Lock Pin switch LSPI thus opening the circuit between connections 4 and 5 and insuring that the Gate solenoid 612 cannot be energized to close the gate so long as the star wheel remains unlocked. As the star wheel is unlocked, cans from the moving conveyor belts are again transmitted onto the rotating table, and after the desired one hundred and thirty-eight cans have been counted, the star wheel is locked, the gate 216 is closed, and thereafter the rotation of table 214 is stopped, all as previously described.

Meanwhile the magnet 218 traverses to and returns from the basket 208. More specifically, as the lifting magnet reached its raised position above table 214, actuating LSMU Magnet Up limit switch 320, resulting in energizing Magnet Up relay CRMU, the energizing of said relay also closed a circuit through the SU Unloading Traverse valve solenoid 456, Fig. 28, through connections 25, 137 and 138, this circuit including a set of closed CRS-2 contacts, being checked thereby. Energization of the SU solenoid 456 shifts the valve member 448 of the horizontal actuator control valve so as to shift the head 220 to bring the lifting magnet into its unloading position over the receiving basket, as previously described. As the head leaves its loading position, the LSLP Loading Position limit switch 712 is opened, thus breaking the circuit through connection 20 to deenergize the Loading Position relay CRLP.

When the head structure reaches its unloading position, the LSUP Unloading Position limit switch 364 is closed, picking up Unloading Position relay CRUP through connection 36. The energization of relay CRUP energizes the down coil of Step relay CRS-2, Fig. 28, through connections 140, 141 and 145, thus resetting or shifting the CRS-2 relay to its normal position. It will be noted that the circuit is checked by a pair of CRS-2 contacts, as well as by a set of contacts of the Magnet Up CRMU relay which are closed inasmuch as the relay is energized, the magnet being in its up position.

As the Step relay CRS-2 is reset, the circuit between connections 12 and 27 is broken, in the circuit of the down coil of the Magnet Start Down relay CRD. The resetting of relay CRS-2, closing its contacts between connections 180 and 142, picks up Step relay CRS-3 through its up coil, a circuit being established through connections 144, 143, 180, 142, 141 and 145. This circuit passes through and is checked by contacts of the CRS-3 and CRS-4 Step relays, as well as by CRAOX, CRMU and CRUP contacts. As relay CRS-3 is picked up, the Magnet Start Down relay CRD is again picked up through its up coil, a circuit being established through connections 120, 3 and 27, via the CRS-3 contacts. The picking up of relay CRD energizes the Magnet Down SADT solenoid 550 through connection 8, thereby effecting the lowering of the hydraulic actuator piston by the action of gravity, as previously described. As the magnet starts down, the LSMU Magnet Up limit switch 320 is opened, opening the circuit through connection 15 and dropping out Magnet Up relay CRMU.

As the cans engage the bottom of the receiving basket (or a previous layer of cans already placed therein), the lifting magnet 218 and its support plate are moved relatively toward each other, thus closing the LSMD Magnet Down limit switch 414, picking up Magnet Down relay CRMD through connection 35. As relay CRMD is energized, the Magnet Current Relay CRDC is reset through its down coil, a circuit being established through connections 146, 82, 147 and 148, via a set of CRMD contacts. This circuit goes through a set of CRDC contacts, thus checking the position of the CRDC relay, and also through a set of Unloading Position CRUP contacts, thus checking the fact that the magnet is in its unloading position. The circuit also extends through a set of Automatic Operation CRAO contacts, as in the case of other circuits previously described.

The resetting of the Magnet Current relay CRDC breaks the D. C. circuit between connections 83 and 85 thus deenergizing the D. C. Magnet Current relay coils CRDCC-1 and CRDCC-2. This in turn breaks the D. C. circuit between connections 178 and 177, thus deenergizing the lifting magnet coils 426, which releases the load of cans.

As the CRDC relay is reset to its down position, a circuit is established through the counter coil 806 of the Layers counter CRCRF through connections 7, 151, 147 and 148, as the CRDC contacts between connections 151 and 147 are restored to closed position. The energization of the counter coil 806 causes the Layers counter to count the layer of cans deposited into the basket.

The closing of these same CRDC contacts establishes a circuit through the down coil of Step relay CRS-3, a circuit being established through connections 152, 153, 151, 147 and 148. The resetting of the CRS-3 relay opens the circuit through the up coil of the CRD Magnet Start Down relay, the circuit being broken between connections 3 and 27. The resetting of the CRS-3 relay also picks up the CRS-4 Step relay, a circuit being established through its up coil through connections 149, 150, 7, 151, 147 and 148, as the CRS-3 contacts between connections 150 and 7 are closed. This circuit passes through a set of normally closed CRS-4 contacts, thus checking the setting of the CRS-4 relay.

As the CRS-4 relay is picked up, the Magnet Start Down relay CRD is reset, a circuit being established through its down coil through connections 123, 12, and 27, as the CRS-4 contacts between connections 12 and 27 are closed. This circuit passes through a set of CRD contacts between connections 123 and 12 to check the position of the CRD relay. As the CRD relay is reset, the SADT Magnet Down solenoid 550 is deenergized, the circuit being broken between connections 8 and 27. This permits the vertical actuator control valve springs 552 and 524 to act, shifting the main control valve member 514 to its up-position, whereby to cause the upward propulsion of the vertical actuator piston. A predetermined dwell takes place in the shifting of the control valve, as previously described, whereby to permit the lifting magnet to become fully deenergized, before it starts up.

As the lifting magnet starts up, the LSMD Magnet Down limit switch is opened, breaking the circuit between connections 35 and 27, dropping out Magnet Down control relay CRMD. As the CRMD relay is deenergized, the circuit is broken between connections 148 and 27, thus deenergizing the counter coil 806 of the Layers counter CRCRF. Also, the circuit to the down coil of the Magnet Current relay CRDC, and the circuit to the down coil of the CRS-3 Step relay, and the circuit to the up coil of the CRS-4 Step relay are simultaneously broken.

When the lifting magnet reaches its fully raised position, the LSMU Magnet Up limit switch 320 is closed thus closing the circuit between connections 15 and 27, and energizing the Magnet Up CRMU control relay. The energization of this relay energizes the SL Loading Traverse solenoid 454 of the hydraulic actuator control valve, a circuit being established through connections 23, 22 and 154, as the CRMU contacts between 23 and 22 close. The energization of the solenoid 454 causes the shifting of the control valve member 448, as previously described, whereby to shift the head structure 220 to its loading position over the table 214. As the head structure leaves its unloading position, the LSUP Unloading Position limit switch 364 is opened thus breaking the circuit between connections 36 and 27, dropping out the Unloading Position CRUP relay.

As the head structure reaches its loading position, the LSLP Loading Position limit switch 712 is closed, thus closing the circuit between connections 20 and 27, energizing the Loading Position CRLP relay. As the CRLP relay is picked up, the Hydraulic CRH relay is reset, a circuit being established through the down coil of the CRH relay through connections 124, 11, 126 and 127 as the CRLP contacts between connections 126 and 127 are closed. It will be noted that this circuit passes through a set of CRH contacts, checking the position of the CRH relay; also through a set of CRS-4 Step contacts, which must be closed; also through a set of Magnet Up CRMU contacts, checking the fact that the lifting magnet is in its raised position.

As the CRH relay is reset, the Hydraulic Motor starter MSH, is dropped out, its energizing circuit being broken between connections 9 and 27. The hydraulic motor thus remains energized only long enough to cause the lifting magnet to move through one cycle of operation, viz., shift from its raised loading position downwardly to the table 214, then upwardly, then to unloading position over the receiving basket, then downwardly into the basket, then up, and then return "home" to loading position over the table 214. As the magnet reaches its normal or home position, the hydraulic motor is cut off whereby to avoid excess heating of the oil.

As the Hydraulic CRH relay is reset, the CRS-4 Step relay is reset, a circuit being closed through its down coil through connections 155, 156, 157 and 158, as the normally closed CRH contacts between connections 158 and 27 are restored to closed position. This circuit passes through a set of Magnet Up CRMU contacts and a set of Loading Position CRLP contacts, thus checking the fact that the lifting magnet is raised and in its loading position over the table 214.

As the CRS-4 relay is reset, the circuit through the up coil of the CRS-1 Step relay is set up or conditioned so that the CRS-1 relay will again be picked up when the assembling of a new layer of cans upon the table 214 has been completed, and as the LSGO Gate switch 716 is closed. More specifically, the Step relay contacts CRS-1, CRS-2 and CRS-3, the Cycle Start contacts CRCS, the Magnet Up contacts CRMU, the Loading Position contacts CRLP, the Automatic Operation contacts CRAO, and the Counter contacts CRRC (provided the assembling of a new layer of cans upon the table 214 has been completed) are all in a position tending to establish a circuit through the up coil of the CRS-1 Step relay through connections 112-119, 66 and 62. Upon the closing of the CRS-4 Step relay contacts between connections 116 and 117, this circuit is complete except for the LSGO Gate switch 716 which is closed as the gate 216 is closed. Accordingly as the gate is closed, the up coil of the CRS-1 Step relay is again energized, and the cycle is repeated. The speed of the hydraulic actuators is such that, under normal conditions of operation, the empty lifting magnet reaches its home position over the table 214 approximately at the same time that the table becomes filled with cans and the gate 216 is ready to close. If the lifting magnet reaches such position before the gate closes, it merely stands, with the hydraulic motor idle, awaiting the closure of the gate. On the other hand, if the gate closes first, the rotation of the table 214 will be stopped upon the gate closure, as previously described, and the parts will await the return of the head structure 220. As the magnet is then brought into its raised loading position over the table, it will immediately begin its lowering movement, to repeat the cycle, the up coil of the CRS-1 Step relay in this instance being energized upon the closing of the CRS-4 contacts between the connections 116 and 117, inasmuch as the Gate switch 716 is already closed.

The cycles of operation as above described are repeated until the desired number of can layers have been deposited within the receiving basket, whereupon as the counter coil 806 of the CRCRF Layers counter is energized, upon the placing of the final layer of cans into the basket, the counter ratchet reaches a position sufficient to close the CRCRF counter switch 808, Fig. 28A, thus energizing the Layers relay CRCRFX through connection 176.

The energization of relay CRCRFX resets the Basket Out CRBO relay, a circuit being established through the down coil of the CRBO relay through connections 165, 51 and 32 as the CRCRFX contacts between connections 51 and 32 are closed. This circuit passes through a set of CRBO contacts, to check the position of the CRBO relay. The resetting of the CRBO relay breaks the circuit to the up coil of the Cycle Start CRCS relay between connections 72 and 167, so that the CRCS relay cannot be again energized even if the Cycle Start push button 764 (now open) is depressed, until the CRBO relay is again picked up. The opening of these same CRBO contacts extinguishes the In lamps 720 and 762 on the push button panel boards. Accordingly it will be seen that a lighted condition of the lamps requires not only that a basket be in receiving position, but also that the basket not be filled, viz., that it be a basket having proper receiving space for the cans.

The closing of the Layers relay contacts CRCRFX between connections 51 and 32 also establishes a circuit to the down coil of the Cycle Start relay CRCS through connections 164, 51 and 32, thus resetting the CRCS relay. The resetting of the CRCS relay opens the circuit between connections 76 and 32, thus extinguishing the Cycle Start lamps 760 and 722 on the push button panel boards. Also, the energizing circuit for the up coil of the CRS-1 Step relay is opened between connections 113 and 114, so that this relay will not again be energized as the lifting magnet reaches its home position. Accordingly, after the last layer of cans has been deposited in the receiving basket, the lifting magnet is raised from the basket, and the head structure 220 proceeds to its loading or home position and then stops, and the hydraulic motor is deenergized. Similarly as the proper number of cans become accumulated upon the rotating table, the gate 216 is closed and the rotation of the table is stopped. These conditions continue until the filled receiving basket is replaced by the basket handler.

As the basket handler removes the filled basket from the machine, the LSBP Basket Position limit switch 584 is opened. This breaks the circuit between connections 30 and 32, thus deenergizing the Basket Position CRBP relay. As this relay drops out a circuit is established to the up coil of the Basket Out CRBO relay, picking up the relay, the circuit being established through connections 168, 169, 52 and 32 as the normally closed CRBP contacts between connections 52 and 32 are restored to closed position. The closing of these CRBP contacts also energizes the reset coil 810 of the CRCRF Layers counter, thus withdrawing its ratchet holding pawl, as previously described, and restoring the Layers counter to normal position. As the counter is restored its ratchet operated CRCRF switch 808 is opened, breaking the circuit between connections 176 and 27, thus deenergizing the Layers relay CRCRFX.

As the operator now places an empty basket into the machine, the LSBP Basket Position switch 584 is again closed. This energizes the Basket Position relay CRBP through connection 30. As the CRBP relay is energized, a circuit is again established between connections 167 and 32, thus relighting the In lamps 720 and 762 via connections 72 and 167. It will be noted that this circuit between connections 72 and 167 includes a set of CRBO contacts which are now closed. The closing of the CRBP contacts between connections 167 and 32 also sets up the circuit to the up coil of the Cycle Start CRCS relay so that upon the depression of the Cycle Start push button 764 the CRCS relay will again be energized, through connections 166, 75, 72 and 167. It will thus be seen that the opening of the LSBP limit switch 584 by the removal of the filled basket, and the reclosing of the switch by the placement of a new basket into position, are both prerequisites to the initiation of a cycle by the Cycle Start push button, as previously described.

It will thus be seen that the machine provides for the complete and automatic handling of the cans, transmitting them from the continuously operating conveyor into the receiving basket. High speed operation is effected, but without damage to the cans or their contents. The operations are automatic, and the functioning of the machine, in its combined electrical and hydraulic actuation, are interconnected and interlocked so as to preclude improper operation. Thus it is necessary for the basket handler to remove a filled basket, and to replace with an empty one, before the machine can be started. After the empty basket has been placed properly in position, this fact is indicated by the lighting of the lamps 720 and 762 on the push button panels 700 and 704 provided respectively at the conveyor and basket-handler stations. With the receiving basket properly in position, the machine can then be started by the appropriate sequential operation of the Run push button 726 and the Cycle Start push button 764, a sufficiently delayed action, to permit the proper functioning of the D. C. rectifier, being insured by the Timer relay CRMT.

During operation of the machine, as the rotating table 214 becomes properly filled with cans, the can star wheel becomes locked, the gate 216 then closes, and the table then stops its rotation, and the magnet descends, all in interlocked sequence. Ordinarily the head structure 220 returns "home" or to loading position with the lifting magnet 218 raised, at substantially the same time the table becomes filled with cans. However, if the table is not yet filled the magnet merely waits in raised position until the filling is complete, and then proceeds downwardly to engage and raise the cans. Alternatively, if the table becomes filled first, the table rotation stops and awaits arrival of the magnet into "home"

position, whereupon the cycle is repeated. When the desired number of layers of cans have been deposited into the basket, the machine stops, and operations may continue only upon removal of the filled basket and the proper placement of a new basket into position, together with a repeated operation of the Cycle Start push button 764. Throughout the cycle the positioning of the parts is checked by the electrical circuits, so as to stop the machine if any part is out of place. The smooth functioning of the hydraulic actuators is insured, and an adequate dwell takes place in the functioning of the control valve for the vertical actuator, upon the raising of the lifting magnet, so as to permit the magnetic flux to build up or drop, before the magnet moves.

The functioning of the machine may be immediately stopped at any time by the opening of the Stop push button 728 on the conveyor push button panel, or the Stop push button 766 on the panel at the basket station. These push buttons break the circuit between connections 69 and 65, Fig. 28A, thus breaking the holding circuit for the Master CRM relay. As the Master relay drops out, the circuit to wires 13 and 27 is broken, thus deenergizing both the Table Motor starter MST and the Hydraulic Motor starter MSH which are energized from these lines. If during the automatic cycle, the receiving basket 208 is at any time removed from the machine, the opening of the LSBP Basket-Position Limit switch 584, dropping out Basket Position relay CRBP, will break the circuit between connections 34 and 31, Fig. 28A, in the energizing circuit to the Master CRM relay (the normally closed Cycle Start CRCS contacts between connections 34 and 31 being open during the automatic cycle). It will thus be seen that at any time during automatic functioning, when the Cycle Start CRCS relay is picked up, the continuous energization of the Basket Position CRBP relay incident to the proper positioning of the receiving basket, is essential. Upon the stopping of the machine, either by the Stop push buttons, or the inadvertent removal of a basket, the Run push button 726 must again be depressed to resume operations.

The Jog Magnet push button 724 provided on the conveyor panel board 700 may be closed at any time while wires 13 and 27 are energized (viz, after Master Relay CRM has been picked up), whereby to establish a circuit through connection 9 to the Hydraulic Motor starter MSH. The pump motor 270 will remain energized as long as the Jog Magnet push button is held depressed. The push button is employed to lift the magnet to its proper raised position, before starting the automatic cycle, after the machine has been standing idle and in the event the check valve 506, Fig. 24, may have leaked, permitting the dropping of the vertical actuator piston.

The machine also provides for hand operation, by means of the push buttons on panel board 702. To condition the machine for hand operation, the Auto-Hand selector switch 738 is shifted to "Hand" position. This bridges the connections 31 and 59 in the energizing circuit for the Master CRM relay so that the Master relay can be picked up, and held, by the Run push button 740 on the hand panel board, in a manner similar to the functioning of the Run push button 726 on the automatic panel board, as previously described. Inasmuch as the Cycle Start CRCS relay (if in proper position) is reset, circuit is maintained through its normally closed contacts between connections 34 and 31, so that the presence or absence of a basket at the receiving station, and the position of the Basket Position CRBP contacts between connections 34 and 31, is immaterial in hand operation.

The placing of the Auto-Hand selector switch in "Hand" position also breaks the circuit between connections 14 and 27, Fig. 28, thus insuring that the Automatic Operation relays CRAO and CRAOX will not be picked up as the wires 13 and 27 are energized. It will be noted that there is a CRAO or CRAOX contact in the circuit to the up coil of each of the Step relays CRS–1, CRS–2, CRS–3 and CRS–4, thus insuring that the Step relays cannot be inadvertently energized when the machine is conditioned for hand operation.

The movement of the Auto-Hand selector switch to "Hand" position also establishes a circuit between connections 77 and 27, Fig. 28, so that upon depression of the Reset push button 742 a circuit is established through connections 50, 77 and 27 whereby to energize the Reset relay CRR and the Reset Auxiliary relay CRRX. A CRR or a CRRX contact is in an energizing circuit to the down coil of each of the mechanically held Step relays CRS–1, CRS–2, CRS–3 and CRS–4, the Basket Out CRBO relay, and the Cycle Start CRCS relay, so that if any of these relays is in its up position, it will be reset upon the operation of the Reset push button 742.

When all of these relays are in their down or reset position, the Hand Operation relay CRHO and the Hand Operation Auxiliary relay CRHOX are energized, Fig. 28, through connections 159, 160, 161, 162, 163, 71, 73, 77 and 27. There is a CRHO or CRHOX contact associated with each of the several push buttons provided on the manual panel board 702 (with the exception of the Run, Reset and Stop buttons) which on closing condition these push buttons so that they may effect the actuation of their associated relay controls.

Thus to close the normally open gate 216, the Close push button 730 may be actuated, whereby to close a circuit to the up coil of the Counter relay CRRC through connections 190, 1, 56 and 32. The picking up of the CRRC relay breaks the 440-volt circuit between L–1 and connection 188, thus deenergizing the Lock Pin solenoid 610, which was previously energized as the Master CRM relay closed. The deenergization of the Lock Pin solenoid effects the locking of the star wheel and the closing of the LSPI Lock Pin switch 662, which upon closing establishes a circuit through connections 4 and 5 energizing the Gate solenoid 612 to close the gate 216, as in the automatic operation previously described.

To open the gate the Open switch 732 may be actuated. If the head structure 220 is in loading position over the table 214, the Loading Position relay CRLP will be energized, and if the lifting magnet is raised, the Magnet Up relay CRMU will be energized, so that upon closing of the Open switch 732 a circuit is established to the down coil of the Counter relay CRRC through connections 189, 24, 182, 81, 55 and 32. The resetting of the CRRC relay breaks the 440-volt circuit between L–1 and connection 4 thus deenergizing the Gate solenoid 612, and permitting the gate to open. The opening of the gate closes the LSGO Gate switch 714, thus reestablishing the 440-volt circuit through connections 188, 53 and 89 to the Lock Pin solenoid 610, unlocking the star wheel. It will be seen that the gate can thus be opened, even under manual control, only when the lifting magnet is in raised position over the table 214; viz., in its "home" position.

The operator may start and stop the pump motor 270 manually by means of the Start-H and Stop-H push button switches 744 and 746. Closing of switch 744 picks up the hydraulic relay CRH by means of its up coil through connections 121, 10 and 17. Closing of switch 746 resets the CRH relay by energizing its down coil through connections 124, 11 and 17. The MSH Hydraulic Motor Starter coil is controlled directly from the CRH relay through connection 9, provided of course that the lines 13 and 27 are energized by the operation of the Master CRM relay.

With the pump motor running, the operator may lower and raise the magnet by selective operation of the Down push button 752 and the Up push button 750. These buttons effect the selective operation and resetting of the CRD Magnet Start-Down relay which controls the SADT Magnet Down solenoid 550 of the vertical actuator control valve, through connection 8, as previously described. It will be seen that the energizing circuit for the up coil of the CRD relay extends through connections 120, 3, and the Down switch 752 to the connection 37. Similarly the energizing circuit of the down coil of the relay extends through connections 123, 12 and the Up switch 750 to the connection 37. From the connection 37 the circuits extend either through the Unloading Position CRUP relay contacts to the connection 17 or through the Counter relay CRRC contacts and the Loading Position relay CRLP contacts to connection 17 via connection 21. Thus the Up and Down switches 750 and 752 are operative to raise or lower the magnet if the head 220 is in its unloading position, or if it is in its loading position and the gate 216 is closed and the star wheel locked; viz., the Counter relay CRRC is picked up.

With the pump motor in operation, the operator may also manually traverse the head structure 220 between loading and unloading positions by means of the Load and Unload push buttons 754 and 756. Operation of the Unload push button 756 closes a circuit to the SU Unloading Traverse solenoid 456 of the hydraulic actuator control valve through connections 25, 53 and 138 whereby to traverse the head to unloading position. Actuation of the Load push button 754 closes the circuit to the SL Loading Traverse solenoid 454 through connections 23, 22 and 63. It will be seen that both of these circuits include a set of Magnet Up CRMU contacts, insuring that the magnet carrying head structure can be horizontally traversed only when the magnet is raised.

By selective operation of the On push button 734 and the Off push button 736 the operator may manually energize and deenergize the Magnet Current CRDC relay, which as previously described controls the D. C. circuit so as to energize and deenergize the magnet coils 426. It will be seen that the energizing circuit to the up coil of the CRDC relay is through connections 128, 84, 64, 130 and 27, and includes a set of Magnet Down CRMD contacts. Similarly the energizing circuit of the down coil of the CRDC relay is through connections 146, 82, 54 and 148 and includes a set of CRMD contacts. Thus the magnet current can be turned on or off only when the magnet is down or in its lowered position.

It will be noted that during hand operation the LSCRL Cans Per Layer counter switch 614 remains operative, performing its normal functions, so that the Totalizer Counter CRCRT continues to count the total cans handled, during hand operation, and the Cans Per Layer counter CRCRL will effect the automatic closing of the gate 216, as in automatic operation, after the table has been filled. It will be noted that the circuit to the LSCRL switch 614 is energized directly from the lines 67 and 32, so as to be operative even though the Master relay CRM is not picked up. This is true of certain of the other parts of the system including the energizing circuit for the Cycle Start CRCS relay, and for the Counter and gate controlling relay CRRC. It is likewise true as to the energizing circuits for the Basket Out and Basket Position relays CRBO and CRBP, so that these parts are operative before the Run push button has been operated.

In the event that it is desired to remove layers of cans from the basket 208, and deposit them automatically onto the table 214, the Empty-Off-Fill selector switch may be set to "Empty" position. By referring to the D. C. circuit, Fig. 28A, it will be seen that with the Empty-Off-Fill switch in "Empty" position, the D. C. Magnet Current relay coils CRDCC-1 and CRDCC-2 will be picked up through connection 86 rather than through connection 85, as previously described. The connections 85 and 86 are reversed in respect to the action of the Magnet Current relay CRDC, which effects the energization and deenergization of the lifting magnet (viz., connection 86 is energized when the CRDC relay is down, whereas connection 85 is energized when the relay is up). Accordingly with the Empty-Off-Fill selector switch in "Empty" position, if the magnet structure is moved through its automatic cycle by means of the Cycle Start push button, the magnet will be energized as it moves into the receiving basket, and deenergized as it moves onto the table 214. By this means the cans can be withdrawn from the basket and deposited upon the table 214, being removed from the table manually or by any suitable means. Movement of the Empty-Off-Fill selector switch to "Off" position prevents energization of the magnet coils 426 as the magnet is cycled, in the event such action is desired.

The Stop switch 748 on the hand push button panel, will effect immediate stopping of the machine at any time, as in the case of the stop switches 728 or 766 previously described.

Certain features of the electrical control circuits more particularly relating to the article basket, and certain phases of the machine which are incident thereto, are not herein claimed, but are claimed in the co-pending application of L. J. Bulliet, Serial Number 601,899, filed June 27, 1945 and entitled Article Handling Machine.

It is obvious that various changes may be made in the specific embodiment set forth without departing from the spirit of the invention. The invention is accordingly not to be limited to the specific embodiment shown and described but only as indicated in the following claims.

The invention is hereby claimed as follows:

1. A machine for handling metal articles at and between loading and unloading stations comprising a support at the loading station, means for feeding metal articles onto the support, means for moving the support during the feeding of the articles thereto to effect a rearranging of the aricles on the support into a composite group having a predetermined pattern, a counter actuated by the articles fed to the support, a magnetic grapple shaped to conform to said pattern for removing the articles from the support, energizing means for the grapple for causing the articles to adhere thereto, and means for shifting the grapple from said support to the unloading station along a predetermined path of travel, said counter controlling the movement of said support and the action of the grapple energizing and shifting means.

2. A machine for handling metal articles at and between loading and unloading stations comprising a support at the loading station, means for feeding metal articles onto the support, means for moving the support during the feeding of the articles thereto to effect a rearranging of the articles on the support into a composite group having a predetermined pattern, a counter actuated by the articles fed to the support, a shiftable gate member through which the articles are transmitted to the support, a magnetic grapple shaped to conform to said pattern for removing the articles from the support, energizing means for the grapple for causing the articles to adhere thereto, and means for shifting the grapple from said support to the unloading station along a predetermined path of travel, said counter and gate controlling the movement of said support and the action of the grapple energizing and shifting means.

3. A machine for handling metal articles at and between loading and unloading stations comprising a conveyor, a rotatable table at the loading station, means for feeding metal articles from the conveyor onto said table, means for disabling the operation of the feeding means after a predetermined number of articles have been transmitted onto the table, means for rotating the table during the feeding of the articles to form the articles into a predetermined pattern thereon, a magnetic grapple for removing the articles from the table, energizing means for the grapple for causing the articles to adhere thereto, means for shifting the grapple from said table to the unloading station along a predetermined path of travel, and a common control mechanism for controlling the operation of the table rotating means and the energizing means for the magnetic grapple.

4. A machine for handling metal articles at and between loading and unloading stations comprising a support at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a pair of reciprocable hydraulic actuators shiftable along relatively angularly disposed axes and jointly operable to effect the movement of the grapple, and means controlled by the operation of the grapple energizing means for controlling the reversing of the hydraulic actuators.

5. A machine for handling metal articles at and between loading and unloading stations comprising a support for the articles at the loading station, a magnetic grapple for removing the articles from the support, energizing means for the grapple for causing the articles to adhere thereto, hydraulic means including an actuator for shifting the grapple from said support to the unloading station along a predetermined path of travel, and a control member actuated by the engagement of the magnetic grapple with the articles for controlling the reversing of said actuator.

6. A machine for handling metal articles at and between loading and unloading stations comprising a support for the articles at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a reciprocable actuator, means for reversing the actuator at an invariable position at one end of its stroke of operation, and a control member actuated by the engagement of the magnetic grapple with the articles for controlling the reversing of the actuator at the opposite end of its stroke of operation.

7. A machine for handling metal articles at and between loading and unloading stations comprising a support at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a pair of reciprocable hydraulic actuators shiftable along relatively angularly disposed axes and jointly operable to effect the movement of the grapple, a substantially constant volume pump for dispatching propelling fluid to the actuators, a relief valve connected to the outlet side of the pump, and an adjustable metering orifice disposed in the fluid flow line of at least one of said actuators whereby to effect the speed control thereof, and means controlled by the operation of the grapple energizing means for controlling the reversing of the hydraulic actuators.

8. A machine for handling metal articles at and between loading and unloading stations comprising a support at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a pair of reciprocable hydraulic actuators shiftable along relatively angularly disposed axes and jointly operable to effect the movement of the grapple, and control valve means for controlling the operations of the actuators, said control valve means comprising a reversing valve, a pilot valve for controlling the reversing valve, and a solenoid controlled by the operation of the grapple energizing means for controlling the operation of the pilot valve.

9. A machine for handling metal articles at and between loading and unloading stations comprising a support at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a pair of reciprocable hydraulic actuators shiftable along relatively angularly disposed axes and jointly operable to effect the movement of the grapple, and a pump, fluid reservoir, and a control valve mounted to shift as a unit with the magnetic grapple in at least one direction of its travel, and means controlled by the operation of the grapple energizing means for controlling the reversing of the hydraulic actuators.

10. A machine for handling metal articles at and between loading and unloading stations comprising a support at the loading station, means for feeding metal articles onto the support, means for rearranging the articles on the support during the feeding of the articles thereto to form the articles into a composite group having a predetermined pattern, a magnetic grapple shaped to conform to said pattern for removing the articles from the support, energizing means for the grapple for causing the articles to adhere thereto, hydraulic means for shifting the grapple from said support to the unloading station along a predetermined path of travel, said hydraulic means comprising a pump, a control valve and a hydraulic actuator, and means controlled by the operation of the grapple energizing means for controlling the reversing of the hydraulic actuator.

11. A machine for handling metal articles at and between loading and unloading stations comprising a support at the loading station, means for feeding metal articles onto the support, a counter actuated by the articles fed to the support, a shiftable gate member through which the articles are transmitted to the support, a magnetic grapple for removing the articles from the support, energizing means for the grapple for causing the articles to adhere thereto, and hydraulic means comprising a pump, a control valve and a hydraulic actuator for shifting the grapple from said support to the unloading station along a predetermined path of travel, said counter and gate controlling the feeding of the metal articles onto the support and the action of the grapple energizing means.

12. A machine for handling metal articles at and between loading and unloading stations comprising a conveyor, a rotatable table at the loading station, means for feeding metal articles from the conveyor onto said table, means for disabling the operation of the feeding means after a predetermined number of articles have been transmitted onto the table, means for rotating the table during the feeding of the articles to form the articles into a predetermined pattern thereon, a magnetic grapple for removing the articles from the table, energizing means for the grapple for causing the articles to adhere thereto, hyhydraulic means comprising a pump, a control valve and a hydraulic actuator for shifting the grapple from said table to the unloading station along a predetermined path of travel, and a common control mechanism for controlling the operation of the table rotating means and the energizing means for the magnetic grapple.

13. A machine for handling metal articles at and between loading and unloading stations comprising a support at the loading station, means for feeding articles onto the support, means for moving the support during the feeding to rearrange the articles thereon into a predetermined pattern, a magnetic grapple shaped to conform to said pattern for removing the articles from the support, energizing means for the grapple for causing the articles to adhere thereto, hydraulic means for shifting the grapple from said support to the unloading station along a predetermined path of travel, said hydraulic means comprising a pump, a control valve, and a pair of reciprocable hydraulic actuators shiftable along relatively angularly disposed axes and jointly operable to effect the movement of the grapple, and means controlled by the operation of the grapple energizing means for controlling the reversing of the hydraulic actuators.

14. A machine for handling metal articles at and between loading and unloading stations comprising a support at the loading station, means for feeding articles onto the support, counter mechanism for disabling the operation of the feeding means after a predetermined number of the articles have been transmitted onto the support, means for moving the support during the feeding operation to rearrange the articles thereon into a predetermined pattern, a magnetic grapple for removing the articles from the support, energizing means for the grapple for causing the articles to adhere thereto, hydraulic means for shifting the grapple from said support to the unloading station along a predetermined path of travel, said hydraulic means comprising a pump, a control valve and a pair of reciprocable hydraulic actuators shiftable along relatively angularly disposed axes and jointly operable to effect the movement of the grapple, and means controlled by the operation of the grapple energizing means for controlling the reversing of the hydraulic actuators.

15. A machine for handling metal articles at and between loading and unloading stations comprising a support at the loading station, means for feeding metal articles onto the support, a counter for counting the articles fed by the feeding means, a magnetic grapple for removing the articles from the support, energizing means for the grapple for causing the articles to adhere thereto, means for shifting the grapple from said support to the unloading station along a predetermined path of travel, a counter for counting the trips of operation of the grapple, and control means for the grapple shifting means conjointly operated by both said counters.

16. A machine for handling metal articles at and between loading and unloading stations comprising a support at the loading station, means for feeding metal articles onto the support, a counter for counting the articles fed by the feeding means, means for rearranging the articles on the support during the feeding to arrange the articles into a predetermined pattern on said support, a magnetic grapple shaped to conform to said pattern for removing the articles from the support, energizing means for the grapple for causing the articles to adhere thereto, means for shifting the grapple from said support to the unloading station along a predetermined path of travel, a counter for counting the trips of operation of the grapple, and control means for the grapple shifting means conjointly operated by both said counters.

17. A machine for handling metal articles at and between loading and unloading stations comprising a support at the loading station, means for feeding metal articles onto the support, means for moving the support during the feeding of the articles thereto to effect a rearranging of the articles on the support into a composite group having a predetermined pattern, a magnetic grapple for removing the articles from the support, energizing means for the grapple for causing the articles to adhere thereto, hydraulic means comprising a pump, a control valve and a hydraulic actuator for shifting the grapple from said support to the unloading station along a predetermined path of travel, a counter for counting the trips of operation of the grapple, and means conjointly operated by the support moving means and the counter for controlling the operation of the hydraulic means.

18. A machine for handling metal articles at and between loading and unloading stations comprising a support for the articles at the loading station, a magnetic grapple for removing the articles from the support, energizing means for the grapple for causing the articles to adhere thereto, means for shifting the grapple from said support to the unloading station along a predetermined path of travel, said grapple comprising a main body portion and an auxiliary body portion shiftable relatively toward each other upon engagement of the grapple with the articles, and means operable by the shifting of said body portions relatively toward each other for controlling the operation of the grapple shifting means.

19. A machine for handling metal articles at and between loading and unloading stations comprising a support for the articles at the loading station, a magnetic grapple for removing the articles from the support, energizing means for the grapple for causing the articles to adhere thereto, means for shifting the grapple from said support to the unloading station along a predetermined path of travel, said grapple comprising a main body portion and an auxiliary body portion shiftable relatively toward each other upon engagement of the grapple with the articles, and an electric switch carried by one of said body portions and operated by the shifting of said body portions relatively toward each other for controlling the operation of the grapple shifting means.

20. A machine for handling metal articles at and between loading and unloading stations comprising a support for the articles at the loading station, a magnetic grapple for removing the articles from the support, energizing means for the grapple for causing the articles to adhere thereto, hydraulic means comprising a pump, a control valve and a hydraulic actuator for shifting the grapple from said support to the unloading station along a predetermined path of travel, said grapple comprising a main body portion and an auxiliary body portion shiftable relatively toward each other upon engagement of the grapple with the articles, and means operated by the shifting of said body portions relatively toward each other upon engagement of the magnetic grapple with the articles for controlling the reversing of the hydraulic actuator.

21. A machine for handling metal articles at and between loading and unloading stations comprising a conveyor, a rotatable table at the loading station, means for feeding metal articles from the conveyor onto said table, a gate through which the articles are transmitted during the feeding for controlling the number of articles transmitted by the feeding means to the table, means for rotating the table during the feeding of the articles to form the articles into a predetermined pattern thereon, a magnetic grapple for removing the articles from the table, energizing means for the grapple for causing the articles to adhere thereto, means for shifting the grapple from said table to the unloading station along a predetermined path of travel, and control means operated by the gate for controlling the operation of the table rotating means.

22. A machine for handling metal articles at and between loading and unloading stations comprising a support at the loading station, means for feeding metal articles onto the support, a counter for counting the articles fed by the feeding means, means for shifting the support during the feeding operation to arrange the articles into a predetermined pattern on the support, a magnetic grapple for removing the articles from the support, energizing means for the grapple for causing the articles to adhere thereto, means for shifting the grapple from said support to the unloading station along a predetermined path of travel, a counter for counting the trips of operation of the grapple, and control means operated by both said counters for controlling the support shifting means and the grapple shifting means.

23. A machine for handling metal articles at and between loading and unloading stations comprising a support at the loading station, means for feeding metal articles onto the support, means for moving the support during the feeding of the articles thereto to effect the arranging of the articles on the support into a composite group having a predetermined pattern, a magnetic grapple for removing the articles from the support, energizing means for the grapple for causing the articles to adhere thereto, means for shifting the grapple from said support to the unloading station along a predetermined path of travel, and means controlled by the support moving means for controlling the grapple energizing means.

24. A machine for handling metal articles at and between loading and unloading stations comprising a support for the articles at the loading station, means for feeding metal articles onto the support, means for moving the support during the feeding operation to form the articles into a composite group of predetermined pattern on the support, a magnetic grapple shaped to conform with said pattern for removing the articles from the support, energizing means for the grapple for causing the articles to adhere thereto, means for shifting the grapple from said support to the unloading station along a predetermined path of travel, contact means carried by the grapple and actuated upon contact of the grapple with the articles, and means controlled by the support moving means and the contact means for controlling the operation of the grapple shifting means.

25. A machine for handling metal articles at and between loading and unloading stations comprising a support for the articles at the loading station, a magnetic grapple for removing the articles from the support, energizing means for the grapple for causing the articles to adhere thereto, means for shifting the grapple from said support to the unloading station along a path of travel of progressively varying length in accordance with the accumulation of articles at the unloading station, means for counting the cycles of movement of the grapple, and means controlled by the counting means for controlling the operation of the grapple energizing means and the grapple shifting means to disable the operation of the grapple upon the accumulation of a predetermined number of articles at the unloading station.

26. A machine for handling metal articles at and between loading and unloading stations comprising a support at the loading station, means for feeding metal articles onto the support, a counter for counting the articles fed by the feeding means, a magnetic grapple for removing the articles from the support, energizing means for the grapple for causing the articles to adhere thereto, means for shifting the grapple from said support to the unloading station along a path of travel of progressively varying length depending upon the accumulation of articles at at least one of said stations, a counter for counting the trips of operation of the grapple, and control means for the grapple shifting means conjointly operated by both said counters.

27. A machine for handling metal articles at and between loading and unloading stations comprising a support for the articles at the loading station, means for feeding metal articles onto the support, a magnetic grapple for removing the articles from the support, energizing means for the grapple for causing the articles to adhere thereto, means for shifting the grapple from said support to the unloading station along a predetermined path of travel, and means carried by the grapple and actuated upon contact of the grapple with the articles for controlling the operation of the grapple energizing means.

28. A machine for handling metal articles at and between loading and unloading stations comprising a support for the articles at the loading station, means for feeding articles onto the support, means for moving the support during the feeding operation to arrange the articles on the support into a predetermined pattern, a magnetic grapple shaped to conform to said pattern for removing the articles from the support, energizing means for the grapple for causing the articles to adhere thereto, means for shifting the grapple from said support to the unloading station along a path of travel of progressively varying length in accordance with the accumulation of articles at the unloading station, means for counting the cycles of movement of the grapple, and means controlled by the counting means for controlling the operation of the grapple energizing means and the grapple shifting means to disable the operation of the grapple upon the accumulation of a predetermined number of articles at the unloading station.

29. A machine for handling metal articles at and between loading and unloading stations comprising a support at the loading station, means for feeding metal articles onto the support, means for moving the support during the feeding to form the articles thereon into a predetermined pattern, a counter for counting the articles fed by the feeding means, a magnetic grapple shaped to conform to said pattern for removing the articles from the support, energizing means for the grapple for causing the articles to adhere thereto, means for shifting the grapple from said support to the unloading station along a predetermined path of travel, a counter for counting the trips of operation of the grapple, and control means for the grapple shifting means and for the support moving means conjointly operated by both said counters.

30. A machine for handling metal articles at and between loading and unloading stations comprising a support at the loading station, means for feeding metal articles onto the support, a counter for counting the articles fed by the feeding means, a magnetic grapple for removing the articles from the support, energizing means for the grapple for causing the articles to adhere thereto, means for shifting the grapple from said support to the unloading station along a predetermined path of travel, a switch carried by the grapple operable upon contact of the grapple with the articles for controlling the grapple energizing means, a counter for counting the trips of operation of the grapple, and control means for the grapple shifting means conjointly operated by both said counters.

31. A machine for handling metal articles at and between loading and unloading stations comprising a support for the articles at the loading station, a magnetic grapple for removing the articles from the support, energizing means for the grapple for causing the articles to adhere thereto, hydraulic means comprising a pump, an electrically actuated control valve and a hydraulic actuator for shifting the grapple from said support to the unloading station along a predetermined path of travel, and a control switch actuated by the engagement of the magnetic grapple with the articles for controlling the operation of said valve.

32. A machine for handling metal articles at and between loading and unloading stations comprising a support for the articles at the loading station, a magnetic grapple for removing the articles from the support, energizing means for the grapple for causing the articles to adhere thereto, hydraulic means for shifting the grapple from said support to the unloading station along a predetermined path of travel, said hydraulic means comprising a pump, a control valve and a plurality of relatively angularly disposed hydraulic actuators, and a control member actuated by the engagement of the magnetic grapple with the articles for controlling the reversing of the hydraulic actuators.

33. A machine for handling metal articles at and between loading and unloading stations comprising a conveyor, a rotatable table at the loading station, means for feeding metal articles from the conveyor onto said table, means comprising a gate through which articles are transmitted onto the table for disabling the operation of the feeding means after a predetermined number of articles have been transmitted onto the table, means for rotating the table during the feeding of the articles to form the articles into a predetermined pattern thereon, a magnetic grapple for removing the articles from the table, energizing means for the grapple for causing the articles to adhere thereto, means for shifting the grapple from said table to the unloading station along a predetermined path of travel, and a common control mechanism including said gate for controlling the operation of the table rotating means and the energizing means for the magnetic grapple.

34. A machine for handling metal articles at and between loading and unloading stations comprising a conveyor, a rotatable table at the loading station, means for feeding metal articles from the conveyor onto said table, means for disabling the operation of the feeding means after a predetermined number of articles have been transmitted onto the table, means for rotating the table during the feeding of the articles to form the articles into a predetermined pattern thereon, a magnetic grapple for removing the articles from the table, energizing means for the grapple for causing the articles to adhere thereto, means for shifting the grapple from said table to the unloading station along a predetermined path of travel, a switch operated by the engagement of the grapple with the articles, and a common control mechanism including said switch for controlling the operation of the table rotating means and the energizing means for the magnetic grapple.

35. A machine for handling metal articles at and between loading and unloading stations comprising a rotatable table for the articles at the loading station, means for feeding metal articles onto the table, means for rotating the table during the feeding to form the articles thereon into a predetermined pattern, a magnetic grapple for removing the articles from the table, energizing means for the grapple for causing the articles to adhere thereto, hydraulic means including an actuator for shifting the grapple from said table to the unloading station along a predetermined path of travel, and an electric switch actuated by the engagement of the magnetic grapple with the articles for controlling the reversing of said actuator.

36. A machine for handling metal articles at and between loading and unloading stations comprising a support at the loading station, means for feeding metal articles onto the support, means for moving the support during the feeding of the articles thereto to effect a rearranging of the articles on the support into a composite group having a predetermined pattern, a counter actuated by the articles fed to the support, a magnetic grapple shaped to conform to said pattern for removing the articles from the support, energizing means for the grapple for causing the articles to adhere thereto, hydraulic means comprising a pump, a control valve and a hydraulic actuator for shifting the grapple from said support to the unloading station along a predetermined path of travel, said counter controlling the movement of said support and the action of the hydraulic means and said grapple energizing means.

37. A machine for handling metal articles at and between loading and unloading stations comprising a rotatable table for the articles at the loading station, means for feeding articles onto the table, means for rotating the table during the feeding to form the articles thereon into a predetermined pattern, a magnetic grapple for removing the articles from the table, energizing means for the grapple for causing the articles to adhere thereto, means for shifting the grapple from the table to the unloading station along the path of travel of progressively varying length in accordance with the accumulation of articles at the unloading station, means for counting the cycles of movement of the grapple, and means controlled by the counting means for controlling the operation of the grapple energizing means and the grapple shifting means to disable the operation of the grapple upon the accumulation of a predetermined number of articles at the unloading station.

38. A machine for handling metal articles at and between loading and unloading stations comprising a rotatable table at the loading station, means for feeding metal articles onto the table, means for rotating the table during the feeding to form the articles into a predetermined pattern thereon, a counter for counting the articles fed by the feeding means, a magnetic grapple for removing the articles from the table, energizing means for the grapple for causing the articles to adhere thereto, means for shifting the grapple from the table to the unloading station along a predetermined path of travel, a counter for counting the trips of operation of the grapple, and control means for the grapple shifting means and for the table rotating means conjointly operated by both said counters.

GUSTAF J. PETERSON.
CLARENCE J. SMITH.

REFERENCES CITED

The following references are of record in the file of this patent:

UNITED STATES PATENTS

| Number | Name | Date |
|---|---|---|
| 1,139,070 | Phelps | May 11, 1915 |
| 1,224,475 | Logan | May 1, 1917 |
| 1,231,864 | Downey | July 3, 1917 |
| 1,247,722 | Rogers et al. | Nov 27, 1917 |
| 1,394,245 | Berry | Oct. 18, 1921 |
| 1,558,691 | McDermott | Oct. 27, 1925 |
| 1,612,444 | Kimball et al. | Dec. 28, 1926 |
| 1,620,778 | Odom | Mar. 15, 1927 |
| 1,832,343 | Wittman | Nov. 17, 1931 |
| 1,836,444 | Carnahan | Dec. 15, 1931 |
| 1,860,143 | Fuller et al. | May 24, 1932 |
| 1,881,514 | Keller et al. | Oct. 11, 1932 |
| 1,896,639 | Meyer et al. | Feb. 7, 1933 |
| 1,943,061 | Douglas | Jan. 9, 1934 |
| 2,007,827 | Fletcher | July 7, 1935 |
| 2,041,517 | Rule | May 19, 1936 |
| 2,052,840 | Nussbaum | Sept. 1, 1936 |
| 2,071,859 | Steiner | Feb. 23, 1937 |
| 2,102,640 | Novotney | Dec. 21, 1937 |
| 2,143,026 | Nordquist | Jan. 10, 1939 |
| 2,247,787 | Schmidt | July 1, 1941 |
| 2,254,708 | Nye | Sept. 2, 1941 |
| 2,268,075 | Langer | Dec. 30, 1941 |
| 2,280,854 | Rooney | Apr. 28, 1942 |
| 2,301,028 | Esch | Nov. 3, 1942 |
| 2,307,544 | Robinson | Jan. 5, 1943 |
| 2,318,444 | Wilson | May 4, 1943 |
| 2,352,184 | Bullard, 3d | June 27, 1944 |
| 2,368,138 | Hayden | Jan. 30, 1945 |
| 2,371,128 | Costa | Mar. 13, 1945 |
| 2,384,179 | Knies | Sept. 4, 1945 |
| 2,388,707 | Rundell | Nov. 13, 1945 |
| 2,466,693 | Fischer | Apr. 12, 1949 |

FOREIGN PATENTS

| Number | Country | Date |
|---|---|---|
| 489,791 | Great Britain | Aug. 4, 1938 |